US012795538B2

(12) United States Patent
Rao et al.

(10) Patent No.: US 12,795,538 B2
(45) Date of Patent: Nov. 10, 2026

(54) SUPPORTING POWER SAVINGS IN MULTI-MODAL XR SERVICES

(71) Applicant: InterDigital Patent Holdings, Inc., Wilmington, DE (US)

(72) Inventors: Jaya Rao, Montreal (CA); Senay Negusse, Montreal (CA); Tejaswinee Lutchoomun, Montreal (CA); Ananth Kini, Conshohocken, PA (US); Ahmed Mostafa, Ottawa (CA); Paul Marinier, Brossard (CA); Faris Alfarhan, Montreal (CA); Benoit Pelletier, Roxboro (CA); Janet A. Stern-Berkowitz, Little Neck, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 247 days.

(21) Appl. No.: 18/837,742

(22) PCT Filed: Feb. 10, 2023

(86) PCT No.: PCT/US2023/012764
§ 371 (c)(1),
(2) Date: Aug. 12, 2024

(87) PCT Pub. No.: WO2023/154429
PCT Pub. Date: Aug. 17, 2023

(65) Prior Publication Data
US 2025/0184890 A1 Jun. 5, 2025

Related U.S. Application Data

(60) Provisional application No. 63/410,873, filed on Sep. 28, 2022, provisional application No. 63/395,378, (Continued)

(51) Int. Cl.
*H04W 76/28* (2018.01)
*H04W 28/02* (2009.01)
(Continued)

(52) U.S. Cl.
CPC .................. *H04W 52/0216* (2013.01); *H04W 28/0221* (2013.01); *H04W 52/0219* (2013.01); *H04W 76/28* (2018.02); *H04L 67/131* (2022.05)

(58) Field of Classification Search
None
See application file for complete search history.

(56) References Cited

U.S. PATENT DOCUMENTS

2017/0318536 A1* 11/2017 Manepalli ............. H04W 24/02
2020/0383004 A1* 12/2020 Hande ................... H04W 24/08
(Continued)

OTHER PUBLICATIONS

Kim, et al., "UE Power Saving Techniques for Extended Reality (XR) Services in 5G NR Systems", IEEE, Sep. 13, 2021, 4 pages.
(Continued)

*Primary Examiner* — Kodzovi Acolatse
(74) *Attorney, Agent, or Firm* — Condo Roccia Koptiw LLP

(57) ABSTRACT

Systems, methods, and instrumentalities are described herein associated with supporting power savings in multi-modal services (e.g., XR services). Dynamic and coordinated power saving schemes may be supported, for example, in multi-modal XR services. A wireless transmit/receive unit (WTRU) may be used to enable power savings. A WTRU (e.g., anchor WTRU) may receive information (e.g., via an application or higher layer message(s)) indicating an association between flows and/or other WTRUs (e.g., collaborative group). The anchor WTRU may receive configuration information for a first member WTRU indicating a first set of parameters, a second set of parameters, and a threshold. The anchor WTRU may determine a first duration (e.g., (Continued)

DRX-UL-Gap) associated with the first set of parameters and an expected UL traffic associated with the first member WTRU. The anchor WTRU may send an indication indicating the (e.g., preferred) second set of parameters, for example, if the duration exceeds the threshold.

16 Claims, 6 Drawing Sheets

Related U.S. Application Data filed on Aug. 5, 2022, provisional application No. 63/326,968, filed on Apr. 4, 2022, provisional application No. 63/309,188, filed on Feb. 11, 2022.

(51) Int. Cl.

*H04W 52/02* (2009.01)
*H04L 67/131* (2022.01)

(56) References Cited

U.S. PATENT DOCUMENTS

2021/0321398 A1* 10/2021 Kwon ........................ H04L 1/16
2023/0103503 A1* 4/2023 Awoniyi-Oteri ............................. H04W 52/0216 370/329
2024/0147469 A1* 5/2024 Hande .................... H04W 84/00
2024/0224084 A1* 7/2024 You ........................ H04W 24/02

OTHER PUBLICATIONS

3rd Generation Partnership Project (3GPP), R1-2107377, "Potential Enhancements for XR", 3GPP TSG RAN WG1 #106-e; e-Meeting, Aug. 16-27, 2021, 12 pages.
3rd Generation Partnership Project (3GPP), R2-2207888, "Discussion on XR-specific power saving techniques", 3GPP TSG-RAN WG2 Meeting #119-e; Agenda item: 8.5.3; Huawei, HiSilicon, Aug. 17-29, 2022, 9 pages.

* cited by examiner

100

SUPPORTING POWER SAVINGS IN MULTI-MODAL XR SERVICES

CROSS-REFERENCE TO RELATED APPLICATIONS

The application is the National Stage Entry under 35 U.S.C. § 371 of Patent Cooperation Treaty Application No. PCT/US2023/012764, filed Feb. 10, 2023, which claims the benefit of U.S. Provisional Application 63/309,188, filed Feb. 11, 2022, U.S. Provisional Application 63/326,698, filed Apr. 4, 2022, U.S. Provisional Application 63/395,378, filed Aug. 5, 2022, and U.S. Provisional Application 63/410,873, filed Sep. 28, 2022, the contents of which are incorporated by reference in their entirety herein.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, and instrumentalities are described herein associated with supporting power savings, e.g., in multi-modal services (e.g., XR services). Dynamic and coordinated power saving schemes may be supported, for example, in multi-modal XR services. For example, a wireless transmit/receive unit (WTRU) may be used to enable power savings. A WTRU (e.g., anchor WTRU) may receive information (e.g., via an application or higher layer message(s) indicating an association between flows and/or other WTRUs. The WTRU may send information to the network (e.g., a network entity, such as a base station), for example, for supporting data communications and/or power saving in a collaborative WTRU group. The WTRU may receive configuration information (e.g., from the network) associated with power saving schemes (e.g., parameters, sets of parameters associated with respective member WTRUs, thresholds, etc.) that may be applicable for a group of flows/WTRUs (e.g., a collaborative group). The WTRU may monitor physical downlink control channel(s) (e.g., PDCCH(s)). The WTRU may receive (e.g., from the PDSCH(s) protocol data unit(s) (PDU) in one or more flows, for example, based on a power saving configuration (e.g., dynamically updated power saving configuration). The WTRU may use timing information to switch between different power saving schemes (e.g., parameters/configurations) for the WTRUs in the collaborative group.

An anchor WTRU may receive configuration information associated with a first member WTRU (e.g., in a collaborative WTRU group, which may include an anchor WTRU and one or more member WTRUs). The configuration information associated with the first member may include a first set of parameters (e.g., default parameters), a second set of parameters, a threshold, and/or the like. The sets of parameters may be associated with connected mode discontinuous reception (CDRX). The threshold may be associated with timing information and/or delay associated with expected traffic (e.g., UL traffic). The WTRU may determine a first duration associated with the first set of parameters and an expected UL traffic associated with the first member WTRU. The first duration may be the difference in time between the expected UL traffic and a a CDRX ON-duration (e.g., DRX-UL-Gap). The WTRU may determine that the first duration exceeds the threshold. Based on the determination that the first duration exceeds the threshold, the WTRU may send an indication indicating that the second set of parameters is preferred for the first member WTRU.

A WTRU may determine parameter(s) to use for power savings (e.g., for a power saving scheme) for receiving data (e.g., DL traffic) based on predictability of traffic arrival and inter-flow dependencies across multiple associated flows. The WTRU may receive application information (e.g., higher/application layer information) associated with an application (e.g., XR experience). The application information may include association information associated with flows (e.g., an ID of a group of associated flows, an ID of individual flows) and/or an average relative time (e.g., average time duration that the PDUs across the flows are associated). The WTRU may send assistance information (e.g., to the network), for example, on the application information (e.g., higher/application layer information). The WTRU may receive configuration information (e.g., via RRC signaling). The configuration information may include a first (e.g., default) power saving scheme (e.g., default/first CDRX configuration), which may include a first set (e.g., default set) of parameters associated with the power saving scheme. The configuration information may include an alternative power saving scheme(s) (e.g., a second CDRX configuration), which may include set(s) of alternative parameters (e.g., that may be allowed to be adapted in the alternative power saving scheme). The configuration information may include a threshold (e.g., priority threshold) associated with the relative importance (e.g., priority) of data in each flow. The WTRU may receive a first set of data (e.g., PDUs), for example, for (e.g., all) associated flows). The WTRU may determine a second set of data expected to be received, for example, based on the first set of data and the association information associated with the flows. The WTRU may determine the relative importance (e.g., first priority) associated with the second set of data, for example, based on one or more of a packet size, an arrival time, or a relevance time associated with the second set of data. The WTRU may receive the second set of data. The WTRU may receive the second set of data using a second set of parameters (e.g., from the alternative parameters), for example, if the first priority is greater than or equal to the priority threshold. The WTRU may send an indication that indicates the second set of parameters (e.g., to the network). The WTRU may receive the second set of data using the first set of parameters (e.g., default parameters), for example, if the first priority is less than the priority threshold.

A WTRU (e.g., anchor WTRU) may determine a power saving operation(s) (e.g., power saving scheme(s)/configuration(s)) for a different WTRU in a device group (e.g., collaborative group), for example, based on received data and information associated with inter-device association. The WTRU may send assistance information (e.g., to the network) associated with associated WTRUs (e.g., a first associated WTRU and a second associated WTRU) in a device group (e.g., collaborative group). The WTRU may send assistance information associated with an expected traffic pattern of the associated WTRUs (e.g., first associated WTRU and second associated WTRU). The WTRU may receive configuration information associated with the device group. The configuration information may comprise information on the associated WTRUs in the device group (e.g., WTRU IDs). The configuration information may indicate a power saving scheme(s) (e.g., CDRX) for the first associated WTRU and the second associated WTRU. The power saving scheme(s) may include at least a default scheme for each WTRU. The configuration information may include a duration associated with the use of the default power saving scheme for the second associated WTRU. The WTRU may track a duration of time associated with the power saving scheme for the second associated WTRU. The WTRU may receive data (e.g., in DL) while using the power saving scheme for the first associated WTRU. The WTRU may determine whether the power saving scheme for the second associated WTRU is the default power saving scheme or a different power saving scheme (e.g., non-default power saving scheme), for example, based on the received data and the association between the first WTRU and the second WTRU (e.g., arrival time, relevance time between the first associated WTRU and the second associated WTRU). The WTRU may determine that the power saving scheme for the second associated WTRU is not the default power saving scheme and that the duration associated with the power saving scheme for the second associated WTRU has expired (e.g., via a timer). The WTRU may send an indication (e.g., to the network), indicating a change in the power saving scheme for the second associated WTRU (e.g., WTRU ID). The WTRU may receive a confirmation indication (e.g., from the network) associated with the use of the non-default power saving scheme in the second associated WTRU.

A WTRU (e.g., anchor WTRU) may determine parameters for power savings operation (e.g., schemes) for multiple WTRUs in a device group for receiving data (e.g., traffic), for example, based on inter-flow dependencies across multiple devices. The WTRU may send assistance information (e.g. to the network) associated with associated WTRUs in a device group. The WTRU may send assistance information associated with expected traffic to be received in the associated WTRUs. The WTRU may receive configuration information associated with the device group. The configuration information may indicate one or more of the following: information on the associated WTRUs in the device group (e.g., WTRU IDs); sets of parameters (e.g., for CDRX configuration) for each WTRU in the device group; and a threshold associated with traffic information. The WTRU may receive a first set of data (e.g., first PDU), for example, in downlink. The WTRU may receive an indication (e.g., from an XR application) on traffic information (e.g., packet size, expected arrival, relevance/association of data) of consecutive sets of data (e.g., PDUs) over a period which are destined to an associated WTRU(s) in the device group. The WTRU may determine the expected traffic for the associated WTRU(s) in the device group, for example, based on the traffic information (e.g., estimated volume of data and estimated rate of arrival) over a period. The WTRU may determine that the expected traffic for a given period destined to the associated WTRU(s) is below a threshold. The WTRU may determine parameters (e.g., for CDRX configuration) corresponding to the threshold (e.g., shorter DRX ON, long DRX cycle) for the data that the associated WTRU(s) should expect. The WTRU may send an indication (e.g., to the network) that indicates the selected configuration (e.g., CDRX configuration) for the associated WTRU(s). The WTRU may receive a confirmation indication (e.g., from the network) on the activation of the configuration (e.g., CDRX configuration).

A WTRU may be configured to receive configuration information (e.g., from a network). The configuration information may indicate threshold values related to time drift (e.g., time drift in the arrival time of PDUs and the configured set of parameters for power savings). The WTRU may be configured to send an indication to the network. The indication may include the time drift. The WTRU may receive timing offset information. The WTRU may adjust the timing values in the set of parameters for the configured power savings scheme, for example, based on the timing offset information. The WTRU may assist in aligning schemes (e.g., CDRX configurations), for example, with respect to data transmissions and receptions in UL+DL scenarios.

The WTRU may assist the network in changing a configuration set for PDCCH monitoring occasions. Changing a configuration set for PDCCH monitoring occasions may allow optimal tradeoff in power saving and latency. The WTRU may assist the network in changing a configuration set for PDCCH monitoring occasions, for example, based on determining and/or predicting aspects (e.g., PDB, packet size, etc.) of DL traffic expected in one or more flows. For example, the WTRU may receive configuration information indicating multiple configurations associated with PDCCH monitoring occasions. The WTRU may determine a configuration from the multiple configurations to use for subsequent PDCCH monitoring occasions (e.g., for a determined and/or indicated time).

For example, a WTRU (e.g., anchor WTRU) may determine the transmission instance associated with UL PDUs. The WTRU may determine a time offset associated with (e.g., needed to) adjust the start of a CDRX active duration. The WTRU may send assistance information to the network, for example, for aligning the CDRX active duration with the UL transmission instance.

The WTRU may switch between different power saving schemes. For example, a collaborative WTRU may use timing information to switch between different power saving schemes. A WTRU (e.g., anchor WTRU) may assist member WTRU in selecting a power saving scheme (e.g., selecting the number of antenna elements/panels to activate/deactivate for UL transmission). The WTRU (e.g., anchor WTRU) may determine and send the assistance information, for example, based on determining link/channel conditions between a base station and a set of WTRUs in a collaborative group.

DETAILED DESCRIPTION

Figure 1A:
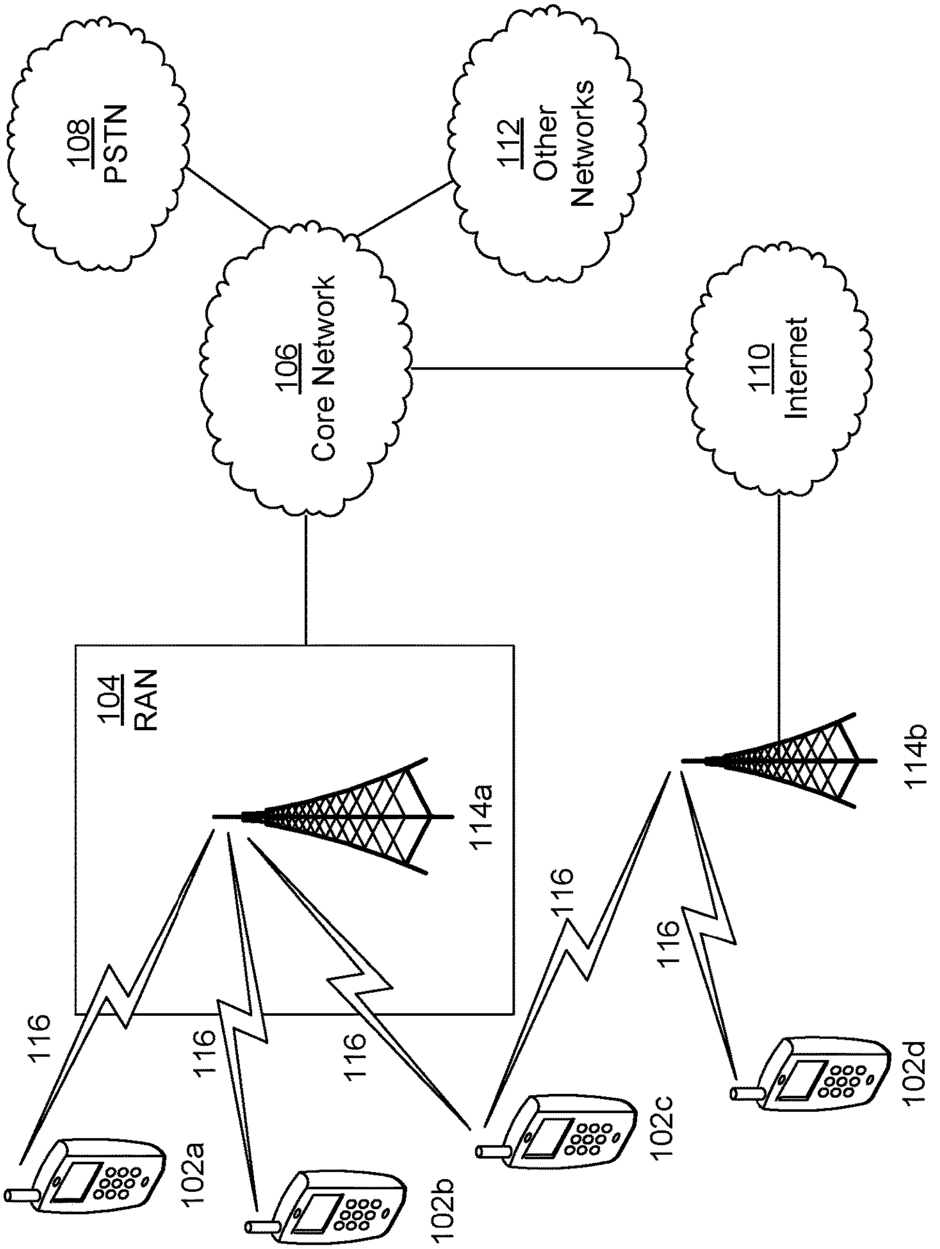
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
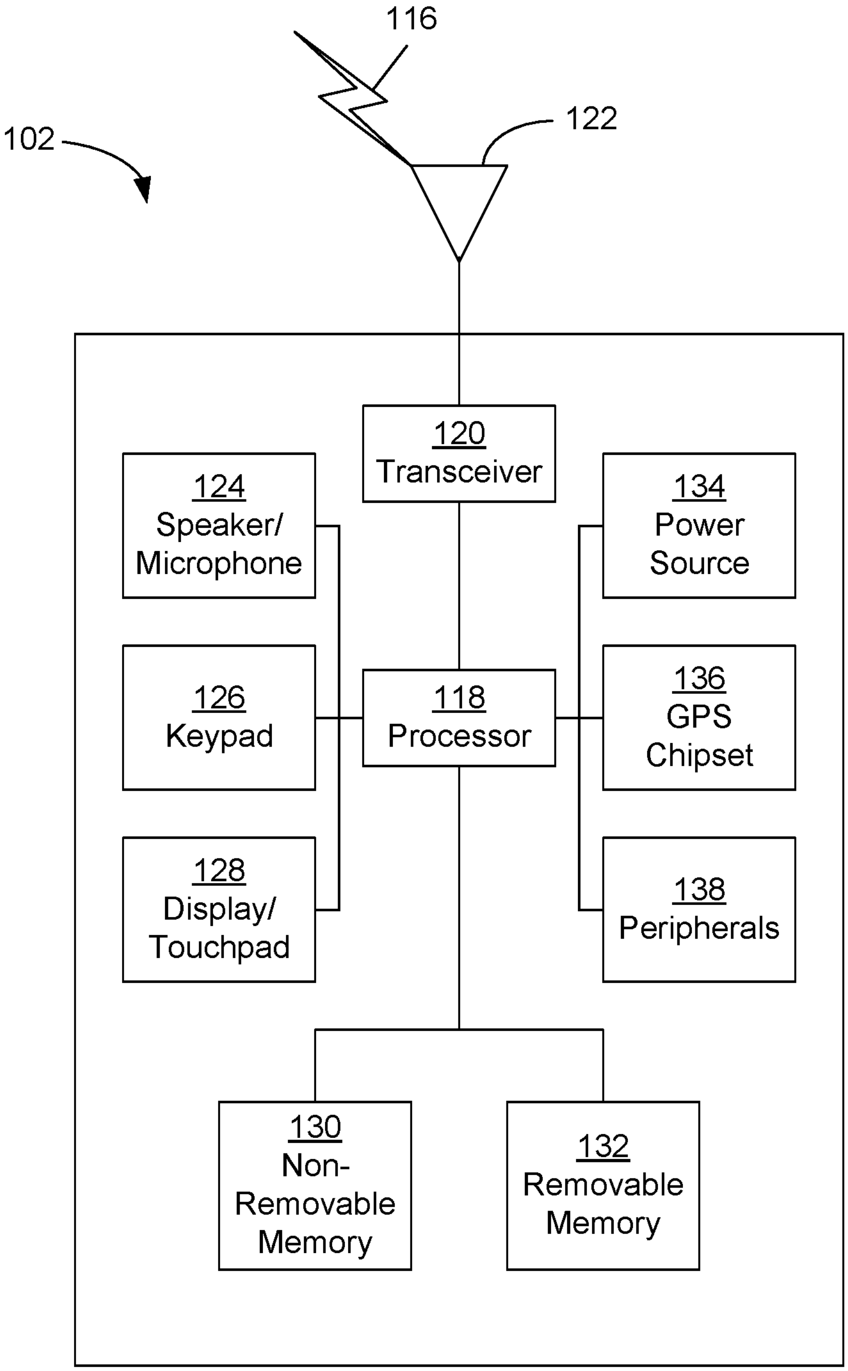
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
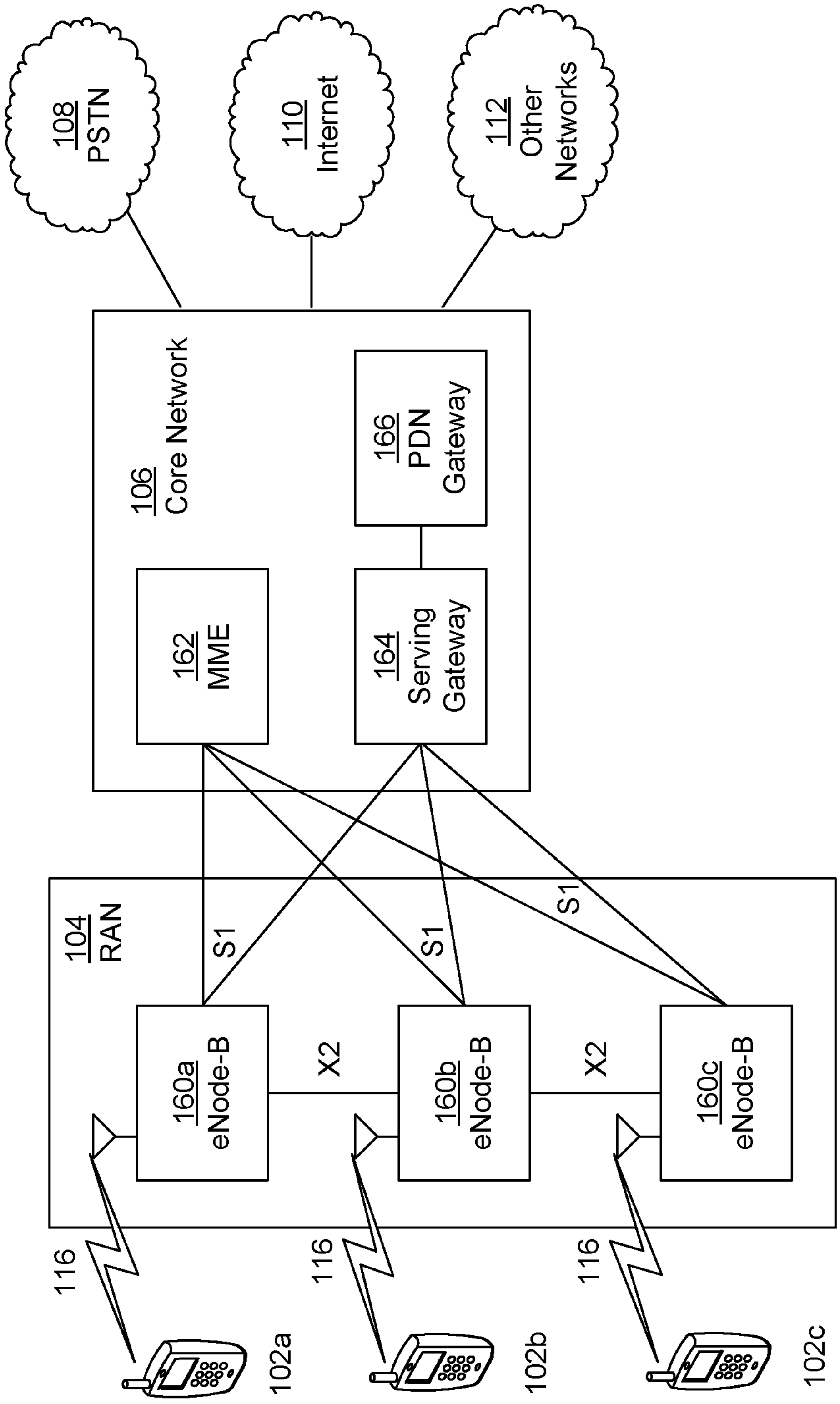
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
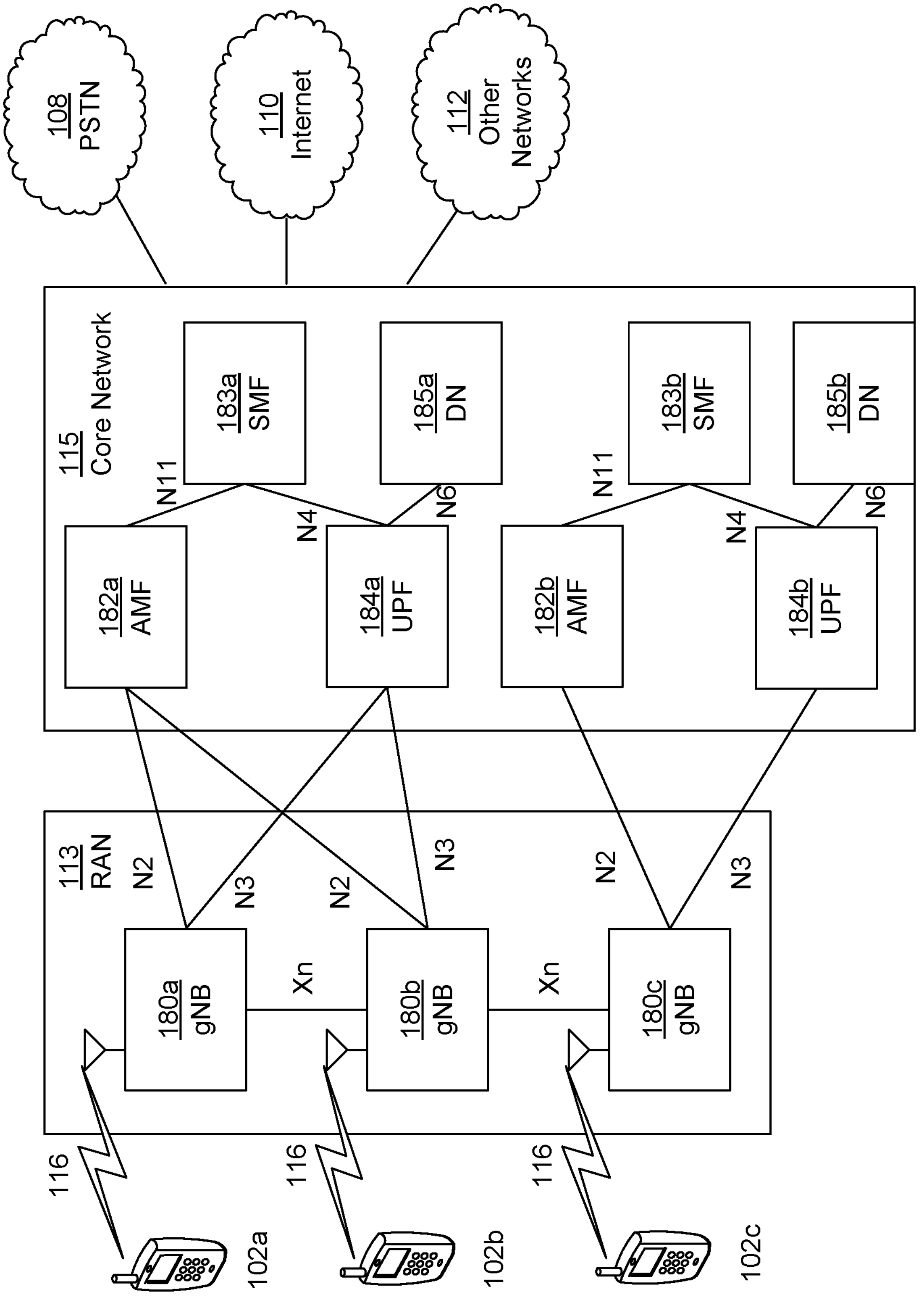
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are described herein associated with supporting power savings, e.g., in multi-modal services (e.g., XR services). Dynamic and coordinated power saving schemes may be supported, for example, in multi-modal XR services. For example, a wireless transmit/receive unit (WTRU) may be used to enable power savings. A WTRU (e.g., anchor WTRU) may receive information (e.g., via an application or higher layer message(s)) indicating an association between flows and/or other WTRUs. The WTRU may send information to the network (e.g., a network entity, such as a base station), for example, for supporting data communications and/or power saving in a collaborative WTRU group. The WTRU may receive configuration information (e.g., from the network) associated with power saving schemes (e.g., parameters, sets of parameters associated with respective member WTRUs, thresholds, etc.) that may be applicable for a group of flows/WTRUs (e.g., a collaborative group). The WTRU may monitor physical downlink control channel(s) (e.g., PDCCH(s)). The WTRU may receive (e.g., from the PDSCH(s) protocol data unit(s) (PDU) in one or more flows, for example, based on a power saving configuration (e.g., dynamically updated power saving configuration). The WTRU may use timing information to switch between different power saving schemes (e.g., parameters/configurations) for the WTRUs in the collaborative group.

An anchor WTRU may receive configuration information associated with a first member WTRU (e.g., in a collaborative WTRU group, which may include an anchor WTRU and one or more member WTRUs). The configuration information associated with the first member may include a first set of parameters (e.g., default parameters), a second set of parameters, a threshold, and/or the like. The sets of parameters may be associated with connected mode discontinuous reception (CDRX). The threshold may be associated with timing information and/or delay associated with expected traffic (e.g., UL traffic). The WTRU may determine a first duration associated with the first set of parameters and an expected UL traffic associated with the first member WTRU. The first duration may be the difference in time between the expected UL traffic and a a CDRX ON-duration (e.g., DRX-UL-Gap). The WTRU may determine that the first duration exceeds the threshold. Based on the determination that the first duration exceeds the threshold, the WTRU may send an indication indicating that the second set of parameters is preferred for the first member WTRU. A WTRU may determine parameter(s) to use for power savings (e.g., for a power saving scheme) for receiving data (e.g., DL traffic) based on predictability of traffic arrival and inter-flow dependencies across multiple associated flows. The WTRU may receive application information (e.g., higher/application layer information) associated with an application (e.g., XR experience). The application information may include association information associated with flows (e.g., an ID of a group of associated flows, an ID of individual flows) and/or an average relative time (e.g., average time duration that the PDUs across the flows are associated). The WTRU may send assistance information (e.g., to the network), for example, on the application information (e.g., higher/application layer information). The WTRU may receive configuration information (e.g., via RRC signaling). The configuration information may include a first (e.g., default) power saving scheme (e.g., default/first CDRX configuration), which may include a first set (e.g., default set) of parameters associated with the power saving scheme. The configuration information may include an alternative power saving scheme(s) (e.g., a second CDRX configuration), which may include set(s) of alternative parameters (e.g., that may be allowed to be adapted in the alternative power saving scheme). The configuration information may include a threshold (e.g., priority threshold) associated with the relative importance (e.g., priority) of data in each flow. The WTRU may receive a first set of data (e.g., PDUs), for example, for (e.g., all) associated flows). The WTRU may determine a second set of data expected to be received, for example, based on the first set of data and the association information associated with the flows. The WTRU may determine the relative importance (e.g., first priority) associated with the second set of data, for example, based on one or more of a packet size, an arrival time, or a relevance time associated with the second set of data. The WTRU may receive the second set of data. The WTRU may receive the second set of data using a second set of parameters (e.g., from the alternative parameters), for example, if the first priority is greater than or equal to the priority threshold. The WTRU may send an indication that indicates the second set of parameters (e.g., to the network). The WTRU may receive the second set of data using the first set of parameters (e.g., default parameters), for example, if the first priority is less than the priority threshold.

A WTRU (e.g., anchor WTRU) may determine a power saving operation(s) (e.g., power saving scheme(s)/configuration(s)) for a different WTRU in a device group (e.g., collaborative group), for example, based on received data and information associated with inter-device association. The WTRU may send assistance information (e.g., to the network) associated with associated WTRUs (e.g., a first associated WTRU and a second associated WTRU) in a device group (e.g., collaborative group). The WTRU may send assistance information associated with an expected traffic pattern of the associated WTRUs (e.g., first associated WTRU and second associated WTRU). The WTRU may receive configuration information associated with the device group. The configuration information may comprise information on the associated WTRUs in the device group (e.g., WTRU IDs). The configuration information may indicate a power saving scheme(s) (e.g., CDRX) for the first associated WTRU and the second associated WTRU. The power saving scheme(s) may include at least a default scheme for each WTRU. The configuration information may include a duration associated with the use of the default power saving scheme for the second associated WTRU. The WTRU may track a duration of time associated with the power saving scheme for the second associated WTRU. The WTRU may receive data (e.g., in DL) while using the power saving scheme for the first associated WTRU. The WTRU may determine whether the power saving scheme for the second associated WTRU is the default power saving scheme or a different power saving scheme (e.g., non-default power saving scheme), for example, based on the received data and the association between the first WTRU and the second WTRU (e.g., arrival time, relevance time between the first associated WTRU and the second associated WTRU). The WTRU may determine that the power saving scheme for the second associated WTRU is not the default power saving scheme and that the duration associated with the power saving scheme for the second associated WTRU has expired (e.g., via a timer). The WTRU may send an indication (e.g., to the network), indicating a change in the power saving scheme for the second associated WTRU (e.g., WTRU ID). The WTRU may receive a confirmation indication (e.g., from the network) associated with the use of the non-default power saving scheme in the second associated WTRU.

A WTRU (e.g., anchor WTRU) may determine parameters for power savings operation (e.g., schemes) for multiple WTRUs in a device group for receiving data (e.g., traffic), for example, based on inter-flow dependencies across multiple devices. The WTRU may send assistance information (e.g. to the network) associated with associated WTRUs in a device group. The WTRU may send assistance information associated with expected traffic to be received in the associated WTRUs. The WTRU may receive configuration information associated with the device group. The configuration information may indicate one or more of the following: information on the associated WTRUs in the device group (e.g., WTRU IDs); sets of parameters (e.g., for CDRX configuration) for each WTRU in the device group; and a threshold associated with traffic information. The WTRU may receive a first set of data (e.g., first PDU), for example, in downlink. The WTRU may receive an indication (e.g., from an XR application) on traffic information (e.g., packet size, expected arrival, relevance/association of data) of consecutive sets of data (e.g., PDUs) over a period which are destined to an associated WTRU(s) in the device group. The WTRU may determine the expected traffic for the associated WTRU(s) in the device group, for example, based on the traffic information (e.g., estimated volume of data and estimated rate of arrival) over a period. The WTRU may determine that the expected traffic for a given period destined to the associated WTRU(s) is below a threshold. The WTRU may determine parameters (e.g., for CDRX configuration) corresponding to the threshold (e.g., shorter DRX ON, long DRX cycle) for the data that the associated WTRU(s) should expect. The WTRU may send an indication (e.g., to the network) that indicates the selected configuration (e.g., CDRX configuration) for the associated WTRU(s). The WTRU may receive a confirmation indication (e.g., from the network) on the activation of the configuration (e.g., CDRX configuration).

A WTRU may receive configuration information (e.g., from a network). The configuration information may indicate threshold values related to time drift (e.g., time drift in the arrival time of PDUs and the configured set of parameters for power savings). The WTRU may send an indication to the network. The indication may include the time drift. The WTRU may receive timing offset information. The WTRU may adjust the timing values in the set of parameters for the configured power savings scheme, for example, based on the timing offset information. The WTRU may assist in aligning schemes (e.g., CDRX configurations), for example, with respect to data transmissions and receptions in UL+DL scenarios.

The WTRU may assist the network in changing a configuration set for PDCCH monitoring occasions. Changing a configuration set for PDCCH monitoring occasions may allow optimal tradeoff in power saving and latency. The WTRU may assist the network in changing a configuration set for PDCCH monitoring occasions, for example, based on determining and/or predicting aspects (e.g., PDB, packet size, etc.) of DL traffic expected in one or more flows. For example, the WTRU may receive configuration information indicating multiple configurations associated with PDCCH monitoring occasions. The WTRU may determine a configuration from the multiple configurations to use for subsequent PDCCH monitoring occasions (e.g., for a determined and/or indicated time).

The term extended Reality (XR) may refer to (e.g., may be an umbrella term for) different types of immersive experiences, for example, including Virtual Reality (VR), Augmented Reality (AR), Mixed Reality (MR), and/or the realities interpolated among them. Virtual Reality (VR) may be a rendered version of a delivered visual and audio scene. The rendering may be designed to mimic the visual (e.g. stereoscopic 3D) and audio sensory stimuli of the real world (e.g., as naturally as possible) to an observer or user as they move within the limits defined by the application. Augmented Reality (AR) may be when a user is provided with additional information or artificially generated objects, or content overlaid upon their current environment. Mixed Reality (MR) may be an advanced form of AR where some virtual elements are inserted into the physical scene with the intent to provide the illusion that these elements are part of the real scene. XR may include (e.g., all) real-and-virtual combined environments and human-machine interactions generated by computer technology and wearables.

The notion of immersion (e.g., in the context of XR services) may refer to the sense of being surrounded by the virtual environment as well as providing the feeling of being physically and spatially located in the virtual environment. The levels of virtuality may range from partial sensory inputs to fully immersive multi-sensory inputs leading to a virtual reality practically indiscernible from actual reality.

XR devices may be associated with capabilities that offer various degrees of spatial tracking. XR devices may be equipped with various sensors to enable spatial tracking, for example monocular/stereo/depth cameras, radio beacons, GPS, inertial sensors, etc. Spatial tracking may be performed at different levels, e.g., 3 Degrees of Freedom (DoF) (e.g., rotational motion along X, Y and Z axis), or 6 DoF (e.g., rotational and/or translational motion along X, Y and Z axis). Spatial tracking may result in an interaction to experience some form of virtual content. The user may act in and/or interact with the components within extended reality. For example, the actions and/or interactions may involve movements, gestures, eye tracking, etc. Spatial tracking may enable (e.g., may be an important enabler for) immersive XR experience. For example, some form of head and/or motion tracking may ensure that the simulated visual and audio components from the user perspective are updated to be consistent with user's movements. Imprecise and/or delayed spatial tracking may lead to sensation of discomfort and/or motion sickness for the user.

A network may refer to one or more base stations (e.g., gNBs) which in turn may be associated with one or more Transmission/Reception Points (TRPs) and/or any other node (e.g., in the radio access network).

A WTRU may correspond to (e.g., any) XR device/node which may come in variety of form factors. A WTRU (e.g. XR WTRU) may include one or more the following: head mounted displays (HMDs), optical see-through glasses and camera see-through HMDs (e.g., for AR and MR), mobile devices with positional tracking and camera, wearables, etc. Different types of XR WTRUs may be envisioned based on XR device functions (e.g., functions such as display, a camera, sensors, sensor processing, wireless connectivity, XR/Media processing, power supply, etc. may be provided by one or more devices, wearables, actuators, controllers and/or accessories). One or more device/nodes/WTRUs may be grouped into a collaborative XR group, for example, for supporting any of XR applications/services.

A power saving scheme in WTRUs may be enabled.

The receiver of a wireless communication device may be equipped with radio frequency (RF) chains. The RF chains may include active circuitry components which may consume energy during regular transmission/reception of data to/from the network or other wireless communication devices. A wireless communication device may be kept awake (e.g., during which time its active RF circuitry components may be consuming power), for example, if (e.g., when) the device is actively listening for a (e.g., possible) incoming reception or if (e.g., when) the device is actively transmitting/receiving data. The device may go to sleep (e.g., low power) mode, for example, if (e.g., when) it is not actively listening to or transmitting/receiving data.

A device (e.g., an LTE or NR device) may be configured with discontinuous reception (DRX) cycles (e.g., by the network), for example, to enable power saving. Separate short and long DRX cycles (e.g., configuration of separate short and long DRX cycles) may be enabled. The connected mode DRX (C-DRX) cycles may be set in the range of several tens to several hundreds of milliseconds. The device may wake up at (e.g., determined, configured) time instances (e.g., during the DRX on-duration), and may attempt to decode a PDCCH transmission in the first timeslot of the DRX on-duration. If none are received or decoded in the timeslot, the device may decrease a configurable number (e.g., such as via a counter (e.g., ON Duration timer)). The device may (e.g., then) decode (e.g., attempt to decode) a PDCCH transmission in the next PDCCH monitoring opportunity on the active CORESET and/or for the configured search spaces. If the number (e.g., via the counter) reaches zero, the device may go (e.g., go back) to micro-sleep (e.g., the device may refrain from attempting to decode a PDCCH transmission until the next determined DRX on-duration occurs).

Discontinuous reception (DRX) operation may be enabled.

An entity (e.g., MAC entity) may be configured (e.g., via RRC signaling) with a DRX functionality that may control the WTRU's PDCCH monitoring activity for the entity's (e.g., MAC entity's) cell radio network temporary identifier (C-RNTI), cancellation indication RNTI (CI-RNTI), configured scheduling RNTI (CS-RNTI), interruption-RNTI (INT-RNTI), slot format indication-RNTI (SFI-RNTI), semi-persistent channel state information RNTI (SP-CSI-RNTI), transmit power control PUCCH-RNTI (TPC-PUCCH-RNTI), TPC-PUSCH-RNTI, TPC sounding reference signal RNTI (TPC-SRS-RNTI), and/or availability indication RNTI (AI-RNTI). If using DRX operation, the MAC entity may (e.g., additionally and/or alternatively) monitor PDCCH(s) (e.g., as described herein). If/when in RRC_CONNECTED, if DRX is configured (e.g., for (e.g., all) the activated serving cells), the entity (e.g., MAC entity) may monitor the PDCCH discontinuously using the DRX operation (e.g., as described herein). Otherwise, the entity (e.g., MAC entity) may monitor the PDCCH.

DRX operation may be controlled (e.g., via RRC signaling), for example, by one or more of the following parameters: drx-onDurationTimer (e.g., the duration at the beginning of a DRX cycle); drx-SlotOffset (e.g., the delay before starting the drx-onDurationTimer); drx-InactivityTimer (e.g., the duration after the PDCCH occasion in which a PDCCH indicates a (e.g., new) UL or DL transmission for the MAC entity); drx-RetransmissionTimerDL (e.g., the maximum duration until a DL retransmission is received) which may be per DL HARQ process (e.g., except for the broadcast process); drx-Retransmission TimerUL (e.g., the maximum duration until a grant for UL retransmission is received) which may be per UL HARQ process; drx-LongCycleStartOffset (e.g., the long DRX cycle and drx-StartOffset which may define the subframe where the long and short DRX cycle starts); drx-ShortCycle (e.g., the Short DRX cycle) which may be optional; drx-ShortCycleTimer (e.g., the duration the UE shall follow the Short DRX cycle) which may be optional; drx-HARQ-RTT-TimerDL (e.g., the minimum duration before a DL assignment for HARQ retransmission is expected by the MAC entity) which may be per DL HARQ process (e.g., except for the broadcast process); drx-HARQ-RTT-TimerUL (e.g., the minimum duration before a UL HARQ retransmission grant is expected by the MAC entity) which may be per UL HARQ process; ps-Wakeup (e.g., the configuration to start associated drx-onDurationTimer in case DCP is monitored but not detected) which may be optional; ps-TransmitOtherPeriodicCSI (e.g., the configuration to report periodic CSI that is not L1-RSRP on PUCCH during the time duration indicated by drx-onDurationTimer in case DCP is configured but associated drx-onDurationTimer is not started) which may be optional; and/or ps-TransmitPeriodicL1-RSRP (e.g., the configuration to transmit periodic CSI that is L1-RSRP on PUCCH during the time duration indicated by drx-onDurationTimer in case DCP is configured but associated drx-onDurationTimer is not started) which may be optional.

Serving cells (e.g., of a MAC entity) may be configured (e.g., via RRC signaling), for example, in multiple (e.g., two) DRX groups with separate DRX parameters. If (e.g., when) a secondary DRX group is not configured (e.g., not configured via RRC signaling), there may be one (e.g., only one) DRX group and the serving cells (e.g., all serving cells) may belong to that one DRX group. If (e.g., when) multiple (e.g., two) DRX groups are configured, the serving cells (e.g., each serving cell) may be (e.g., uniquely) assigned to any (e.g., either) of the multiple (e.g., two) groups. DRX parameters that may be separately configured for each DRX group may be drx-onDurationTimer and/or drx-Inactivity Timer. The DRX parameters that may be common to the DRX groups may be drx-SlotOffset, drx-Retransmission-TimerDL, drx-RetransmissionTimerUL, drx-LongCycle-StartOffset, drx-ShortCycle (e.g., which may be optional), drx-ShortCycleTimer (e.g., which may be optional), drx-HARQ-RTT-TimerDL, and/or drx-HARQ-RTT-TimerUL. If (e.g., when) DRX is configured, the active time for serving cells in a DRX group includes the time, for example, while one or more of the following occurs: drx-onDurationTimer or drx-InactivityTimer configured for the DRX group is running; drx-RetransmissionTimerDL or drx-RetransmissionTimerUL is running on (e.g., any) serving cell in the DRX group; ra-ContentionResolutionTimer or msgB-ResponseWindow is running; a scheduling request is sent on a PUCCH and is pending; or a PDCCH transmission indicating a new transmission addressed to the C-RNTI of the MAC entity has not been received (e.g., after successful reception of a Random Access Response for the Random Access Preamble not selected by the MAC entity among the contention-based Random Access Preamble).

Traffic models for XR applications may be provided. Service/traffic flows of the different XR applications may be described.

Virtual Reality 1 (VR1) applications may be enabled.

VR1 applications (e.g., streaming of immersive 6DoF) may be modeled using service flows applicable for viewport dependent streaming architecture. Similar to adaptive streaming (e.g., DASH), viewport dependent streaming may allow for dynamically updating the quality of media/video, for example, based on available bitrate in the network and wireless interface. As per the service/traffic flow, the tracking and pose information (e.g., small packet size: <100 B) of the XR device's viewport may be sent periodically with a relatively low data rate (e.g., 0.5-2 Mbps, 60 to 500 Hz) in UL to the XR server. In response, the XR server may send (e.g., in DL) with a high data rate (e.g., 6-18 MBps for 4 k omnidirectional and FoV area streaming) and quasi-periodically (e.g., 40/60/120 fps) the viewport optimized media adaptively (e.g., H.264/265 video), which may be rendered in the XR device display.

The traffic characteristics of VR1 may include the following, for example: (e.g., in UL) pose/viewport information (e.g., including information on 6DoF); and/or (e.g., in DL) a media/video containing viewport optimized scene(s) (e.g., high quality) and media/video for non-viewport scene(s) (e.g., lower quality). The pose/viewport information (e.g., in UL) may be associated with a small packet size (e.g., constant size <100 B), a low data rate (e.g., 0.5-2 Mbps), a single flow, and/or periodic: (e.g., periodicity range of 60 to 500 Hz). The media/video (e.g., in DL) containing viewport optimized scene(s) (e.g., high quality) and media/video for non-viewport scene(s) (e.g., lower quality) may be associated with a large packet size (e.g., variable size with Gaussian distribution or fixed size of 1500 B), a high data rate (e.g., 6-18 Mbps), an E2E, a latency (e.g., 50 ms), multi-flow (e.g., video flows with different bit-rates, 3D media, metadata), and/or quasi-periodic (e.g., periodicity as a function of frame rate of 40/60/120 fps)

Virtual Reality 2 (VR2) applications may be enabled.

VR2 applications (e.g., immersive game spectator mode) may be modeled using service flows which may be applicable to the split rendering architecture. In this case, the XR server may perform pre-rendering and encoding of the 2D media/video frame, for example, based on the pose information sent by the XR device periodically at a low data rate (e.g., 0.5-2 Mbps, 60-500 Hz). The rendering may be mainly performed in the XR-server and sent in DL at high data rate and low latency (e.g., 30-45 Mbps, 10-20 ms). The XR device may decompress the received media/video and may perform asynchronous time-warping (ATW), for example, for correcting the viewport based on latest pose information. While roundtrip time (RTT) latency for transmission of pose information in UL and reception of pre-rendered media in DL may span up to 50 ms, ATW may enable satisfying the motion-to-photon latency requirement (e.g., <20 ms) based on in-device processing.

The traffic characteristics of VR2 may include the following, for example: (e.g., in UL) pose/viewport information; and/or (e.g., in DL) 3D scenes in frame buffers. The pose/viewport information (e.g., in UL) may be associated with a small packet size (e.g., constant size <100 B), a low data rate (e.g., 0.5-2 Mbps), a single flow, and/or periodic (e.g., periodicity range of 60 to 500 Hz). The 3D scenes in frame buffers (e.g., in DL) may be associated with a large packet size (e.g., Gaussian distribution, e.g., max 1500 B or unlimited), a high data rate (e.g., 30-45 Mbps), a latency (e.g., RTT 30 ms (e.g., typical RTT) and max 50 ms), a multi-flow (3D video/media, metadata), and/or quasi-periodic (e.g., periodicity as a function of frame rate of 60/90 fps).

Augmented Reality 1 (AR1) applications may be enabled.

AR1 applications (e.g., real-time communication with shop assistant) may be characterized using service flows applicable to distributed computing architecture. As per the service/traffic flow, the XR device may send the pose information (e.g., 0.5-2 Mbps, 60-500 Hz) and/or video (e.g., 10 Mbps, 10 Hz frame update rate) in UL to the XR server. The received information may be used by the XR server to generate the scene, which may then converted to a 2D (video) or 3D media (3D objects) format along with metadata (e.g., scene description). The compressed media and metadata (e.g., characterized by Pareto distribution) may be delivered quasi-periodically in DL at high data rate (e.g., 30-45 Mbps, 40/60/120 fps). The XR device may generates the AR scene locally, for example, by overlaying 3D objects on 2D video, and may render the scene in the device display.

The traffic characteristics of AR1 may include the following, for example: (e.g., in UL), pose information and/or 2D video stream information; and/or (e.g., in DL) 2D/3D pre-rendered media and/or XR metadata. The pose information (e.g., in UL) may be associated with a small packet size, a low data rate (e.g., of 0.5-2 Mbps), and/or periodic (e.g., 60 to 500 Hz). The 2d video stream information (e.g., in UL) may be associated with a large packet size, a data rate (e.g., of 10 Mbps), periodic (e.g., with update periodicity of 10 Hz), and/or a multi-flow video. The 2D/3D pre-rendered media and XR metadata (e.g., in DL) may be a large packet size (e.g., Pareto distribution), a high data rate (e.g., 30-45 Mbps), a multi-flow (e.g., 2D/3D media and metadata), and/or quasi-periodic (e.g., periodicity as a function of frame rate of 60/90 fps)

Augmented Reality 2 (AR2) applications may be enabled.

AR2 applications (e.g. an XR meeting, AR animated avatar calls) may use service/traffic flows applicable for XR conversational architecture where multiple (e.g., two or more) XR clients/device may perform peer-to-peer communications with intermediary media processing in network. The different types of media that may be supported for AR2 applications (e.g., based on the type of user representation) may include 2D+/RGBD (e.g., 2.7 Mbps), 3D mesh (e.g., 30 Mbps), and/or 3D Video point cloud coding (VPCC)/Geometry-based point cloud compression (GPCC) (e.g., 5-50 Mbps). In typical XR traffic flow, an XR client in the device may initiate a call setup procedure, for example, based on which a session control function triggers network-based media processing. The session control function may forward the call setup to the second XR client/device followed by real-time media processing and streaming with low latency (e.g., E2E <100 ms) to both clients. During an XR call, the 2D/3D media (e.g., and possibly the user pose information) may be transmitted quasi-periodically in UL and DL between the XR clients/devices.

The traffic characteristics of AR2 may include the following, for example: (e.g., UL) 2D/3D media, a pose, and/or a video of the user; and/or (e.g., in DL) 2D/3D media, a pose, and/or a video of the user. The 2D/3D media, pose, and/or video of the user (e.g., in UL) may be associated with a large packet size, a data rate (e.g., 2.7-50 Mbps), a PDB (e.g., <150 ms), a multi-flow (2D/3D media), and/or quasi-periodic (e.g., 60 to 500 Hz). The 2D/3D media, pose, and/or video of the user (e.g., in DL) may be associated with a large packet size (e.g., truncated Gaussian distribution), a data rate (e.g., 2.7-50 Mbps), an E2E PDB (e.g., <100 ms), a multi-flow (2D/3D media), and/or quasi-periodic (e.g., 60 to 500 Hz).

XR Conferencing applications may be enabled.

XR Conferencing applications may provide an immersive conferencing experience between geographically remote users, for example, by representing the users in a 3D volumetric representation (e.g., point clouds or meshes). One or more cameras (with depth perception capability) may be placed at each users' location to allow interactions (e.g., view, hear, rotate, zoom-in, resize) with a full 3D volumetric representation of one another on their respective headsets/glasses. XR Conferencing applications may support simultaneous UL and DL media traffic, for example, with media consisting of audio, video and 3D objects. The media formats that may be applied to capture the user in 3D volumetric format may include 2D+/RGBD (e.g., >2.7 Mbps for 1 camera, >5.4 Mbps for 2 cameras), 3D Mesh (e.g., ~30 Mbps) and 3D VPCC/GPCC (e.g., 5-50 Mbps). The media processor may be located centrally or distributed at the edge. The service/traffic flow between the XR clients/users (e.g., via the in-network media processor) may be expected to be similar to the AR2 and XR conversational use cases. Joining an XR conference session may result in a download peak at the beginning for downloading the virtual environment and associated media objects within the XR application. Throughout the rest of the session, data rates may vary depending on number of users, upload format of the users, and refresh rates of virtual 2D/3D objects/environment.

The traffic characteristics of XR Conferencing may include the following, for example: (e.g., in UL) 2D/3D media, a pose, and/or a real-time video of a user; and/or (e.g., in DL) 2D/3D media, a pose, a real-time video of a user, and/or 2D/3D objects/environment (e.g., possibly from a third party). The 2D/3D media, pose, and/or real-time video of the user (e.g., in UL) may be associated with a large packet size, a data rate (e.g., 2.7-50 Mbps), a multi-flow (2D/3D media), quasi-periodic (e.g., 60 to 500 Hz), and/or low encoder PER (e.g., $<10^{-3}$). The 2D/3D media, pose and/or real-time video of user, 2D/3D objects/environment (e.g., in DL) may be associated with a large packet size, a data rate (e.g., of 2.7-50 Mbps), an E2E PDB (e.g., <100 ms), a multi-flow (e.g., 2D/3D media), quasi-periodic (e.g., 60 to 500 Hz), and/or low encoder PER (e.g., $<10^{-3}$)

Cloud Gaming (CG) applications may be enabled.

CG applications (e.g., 5G online gaming) may use (e.g., predominantly rely on) adaptive streaming architecture, for example, where the rendered video/media in network is streamed to a thin client in the device (e.g. smartphone, tablet). In a (e.g., typical) service/traffic flow for CG, the XR device may send the pose information (e.g., 100 to 250 B) related to the viewport periodically in UL (e.g., 0.1-1 Mbps, 60-500 Hz) to the XR server. The generated viewport-related video/media (e.g., 1500 B) may be encoded/compressed (e.g., H.264/265 video) and sent quasi-periodically by the XR server in DL (e.g., 30-45 Mbps, 30/50/60/90/120 fps, PER: 10e-3). The received video/media may then be rendered in the XR device, for example, upon decoding and processing. The RTT latency for supporting certain high-end CG applications (e.g., Category D: photo-realistic or natural video games) may be determined by the roundtrip interaction delay (e.g., 50 ms). For other CG applications (e.g., Category A, B, C), the uplink PDB may be 10 ms and downlink streaming PDB may range from 50 ms to 200 ms.

The traffic characteristics of CG may include the following, for example: (e.g., in UL) pose/viewport information; and/or (e.g., in DL) 2D/3D media and/or a video of a user. The pose/viewport information (e.g., in UL) may be associated with a small packet size (e.g., 100 to 250 B), a low data rate (e.g., 0.1-1 Mbps), a PDB (e.g., 10 ms), a single flow, and/or periodic (e.g., periodicity range of 60 to 500 Hz). The 2D/3D media and/or video of the user (e.g., in DL) may be associated with a large packet size (e.g., max 1500), a high data rate (e.g., 30-45 Mbps), a PDB (e.g., 20 ms), a multi-flow (2D/3D media, video), quasi-periodic (e.g., periodicity as a function of frame rate of 30/50/60/90/120 fps), and/or PER (e.g., 10e-3)

Figure 2:
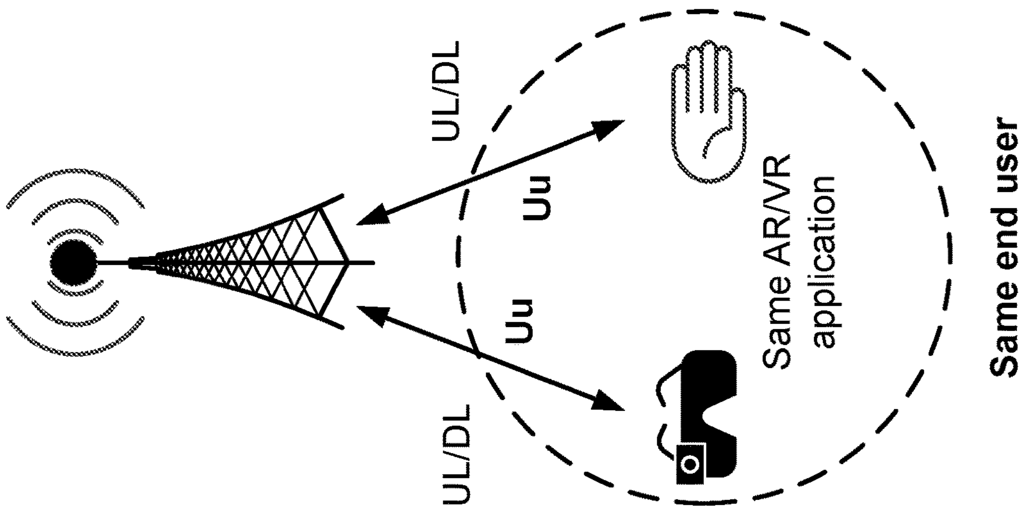
FIG. 2 illustrates an example group of XR devices with multiple flows/devices supporting same XR application.

Applying existing power saving schemes in the standard for XR devices may be challenging for one or more of the following reasons. For example, XR traffic may be characterized by a large packet size, a frequent rate of arrival, jitter and dynamic, and/or at times having a surge in data rate. An (e.g., single) XR application/experience may include multi-flow traffic generated/received by a single WTRU (e.g., HMD: video and pose data) or a group of WTRUs (e.g., HMD, haptic gloves) as shown in FIG. 2. Multi flow traffic in single device may be present (e.g., traffic in an HMD may include video and pose data). Multi flow traffic across multiple devices may be present (e.g., traffic to/from a base station 114*a* and/or a base station 114*b* from/to an HMD and haptic gloves and/or traffic between an HMD and haptic gloves). An XR WTRU may need to satisfy strict QoS requirements, for example, to provide acceptable quality of experience (QoE) (e.g., including acceptable battery life).

FIG. 2 illustrates an example group of XR devices with multiple flows/devices supporting same XR application.

In examples, a first problem may be that because of the characteristics of the XR traffic (e.g., as described herein), power saving (PS) schemes may be inefficient for XR as the available schemes may leave the WTRU to remain awake for a long duration of time, e.g., which may (e.g., significantly) limit the QoE for the user due to short battery life. The tradeoff in a WTRU between meeting expected QoS and achieving power saving may be balanced.

In examples, a second problem may be that because PS schemes are applied on per device bases, in scenarios where the user is running an XR application with multi flow traffic or multiple devices, the available power saving schemes may not consider the traffic association as well as interdependencies across the multiple data flows or devices. The use of power saving schemes across multiple devices supporting a single XR experience (e.g., HMD, smart phone, haptic gloves) may be coordinated.

A collaborative WTRU group may be provided. The terms collaborative XR or collaborative WTRU group may refer to (e.g., but are not limited to) one or more of the following concepts and definitions.

A collaborative XR or a collaborative WTRU group (e.g., and associated operations) may refer to supporting an XR application/service, for example, whereby one or more WTRUs may perform an (e.g., at least one) XR related action resulting in providing XR experiences to the user. An XR related action resulting in providing XR experiences to the user may include enabling the sensation where the user may perceive full or partial immersion in different real/virtual environments and/or the ability to interact with real and/or virtual objects (e.g., including avatars).

A collaborative XR or a collaborative WTRU group (e.g., and associated operations) may refer to a WTRU that may include one or more of the following: independent/stand-alone WTRUs/devices/nodes (e.g., XR device, XR glasses, smart watches); non-stand-alone devices/nodes (e.g., devices associated with a WTRU, sensors, wearable devices, haptics gloves); devices/nodes controlled by network (e.g., network operator); devices/nodes that may not be directly associated with and/or connected to a base station (e.g., gNB), but may be candidate options given certain parameters (e.g., FoV metadata (e.g., size, dimension, quality, etc. of FoV), pose information); stationary/static or moving/mobile devices/nodes/WTRUs; the terms corresponding to any of WTRU, node and device may be used interchangeably and may refer to any of the different WTRU types (e.g., as described herein); etc.

A collaborative XR or a collaborative WTRU group (e.g., and associated operations) may refer to the XR actions, for example, performed completely or partially by one or more WTRUs/nodes/devices (e.g., anchor WTRU and/or collaborative WTRU as part of the collaborative XR group). The XR actions may include one or more of the following: determining of field of view (FoV) metadata, determining of FoV content, performing measurements, handling/forwarding of data associated with XR actions, handling/forwarding of information related to connectivity with network and/or other WTRUs, etc.

XR actions may include determining FoV metadata. For example, determining FoV metadata may involve determining one or more of the perimeter, size, border and boundaries of FoV, e.g., based on measurements in (e.g., any) spatial dimensions, including but not limited to longitude, latitude, altitude, depth, roll, pitch, yaw in one or more coordinate systems (e.g. cartesian, spherical). For example, determining FoV metadata may involve determining the quality of the FoV content, e.g., whether the FoV content is of high quality (e.g., which in the case of an image, may be quantified and assessed by the image resolution (e.g. number of density of megapixels). Determining FoV metadata may be done by one or more WTRUs. For example, a WTRU may determine its own FoV dimensions (e.g., part of UE FoV metadata) while another node may determine its own FoV dimensions (e.g., part of node FoV metadata). The WTRU FoV dimensions and the node FoV dimensions may be overlaid and/or compared against each other to determine the degree of overlap (e.g., 25% overlap, 50% overlap, 0% overlap). In examples, determining FoV metadata may be done for identifying the frames that belong to the overlapping section/segment.

XR actions may include determining FoV content. For example, determining FoV content may involve determining the one or more 2D/3D image/video frames associated with an FoV boundary/perimeter/border (e.g., as defined by the FoV metadata by the WTRU/node for itself and/or on behalf of another WTRU/node). For FoV content mapping, the WTRU may determine the images/video frames using visual sensors (e.g., 2D/3D camera, lidar), RF sensors (e.g. RF transceiver, RADAR), audio sensors (e.g. sonar), etc. The mapping of FoV may also be referred to as sensing of FoV content or capturing of FoV content. For example, determining FoV content may include recording/capturing of audio frames (e.g., either as part of the real environment or as part of an overlaid sound-track/audio file with the audio file originating from a source other than the current real environment being mapped). Determining of FoV content may be done partially or completely by one or more WTRUs/nodes. In examples, part of the FoV content (e.g., first FoV content) may be mapped/sensed by a first WTRU and another part of the FoV content (e.g., second FoV content) may be mapped/sensed by a second WTRU.

XR actions may include performing measurements. For example, the WTRU may perform measurements of pose (e.g., orientation, location/position) of the user and/or other objects which the user may be interacting with. In examples, the WTRU may perform measurements of the radio link interfaces associated with the WTRU (e.g., Uu link, SL).

XR actions may include handling/forwarding of data associated with XR actions. For example, data may include any of media/image/video frames, sensor data, and measurement data (e.g., pose measurements, link/channel measurements) determined by WTRU, e.g., possibly for supporting an application/service/network request associated with the WTRU and/or on behalf of other nodes/devices. In examples, the WTRU may store the data associated with the FoV (e.g., both content and metadata) determined/mapped by the WTRU and/or on behalf of other WTRU. For example, the WTRU may send data (e.g., directly and/or on behalf of another WTRU) to one more destinations (e.g., including a RAN node (e.g., gNB), a core network (CN) function/entity, application function (e.g., hosted in UE or in network), etc.). For example, the WTRU may send and/or receive control signaling (e.g., including ACK/NACK messages). The WTRU may send and/or receive control signaling (e.g., directly and/or on behalf of another UE) possibly for indicating availability/inability for performing any of XR actions.

XR actions may include handling/forwarding of information related to connectivity with a network and/or other WTRUs. Handling/forwarding information related to connectivity with the network and/or other WTRUs may include sending capability information to the network including, for example, capability for supporting one or more interfaces, capability for supporting power saving schemes, capability to coordinate and/or interact with other WTRUs/devices (e.g., via sidelink interfaces) which may be co-located or non co-located with the WTRU, for example. Handling/forwarding information related to connectivity with the network and/or other WTRUs may include receiving configuration information, for example, including receiving RRC configuration information (e.g., from a gNB) and/or layer configuration information (e.g., NAS-layer configuration information), for example, from a CN. Handling/forwarding information related to connectivity with the network and/or other WTRUs may include sending requests and/or receiving responses to/from network and/or other WTRUs for establishing/modifying connectivity. Handling/forwarding information related to connectivity with the network and/or other WTRUs may include sending requests for resource grants (e.g., dynamic grants, semi-static grants) for a WTRU and/or on behalf of other WTRUs. Handling/forwarding information related to connectivity with the network and/or other WTRUs may include triggering resource (re) selection for determining radio resources from configured resource pools. Handling/forwarding information related to connectivity with the network and/or other WTRUs may include performing measurements, for example, including measurements of one or more of reference signals (e.g., SSB, CSI-SR, PRS, sidelink RS), GNSS signals, unlicensed carriers, ultra-wideband signals, LIDAR signals, visual signals, etc. Handling/forwarding information related to connectivity with the network and/or other WTRUs may include triggering of transmission and/or measurement of reference signals in other one or more WTRUs (e.g., via a Uu link and/or sidelink), for example. Handling/forwarding information related to connectivity with the network and/or other WTRUs may include sending a measurement report to the network and/or another WTRU.

In examples, one or more WTRUs/nodes (e.g., possibly associated with a collaborative group) may perform different XR actions, for example, where the different WTRUs/nodes and different XR actions may be coordinated by one or more anchor WTRUs associated with the collaborative group. In examples, an XR action may be divided and/or performed by one more WTRUs/nodes, where an anchor WTRU may perform dividing of the XR action and/or coordinate with the other WTRUs/nodes in a collaborative group for performing the divided XR action. In examples, an XR action (e.g., the same/similar XR action) may be performed by one or more WTRUs/nodes associated with a collaborative group, where the XR action may be performed in parallel.

A collaborative group may include one or more WTRUs. For example, a first WTRU may be designated as an anchor WTRU and second WTRU may be designated as a collaborative WTRU.

An anchor WTRU (e.g., in the context of collaborative XR) may refer to a WTRU (e.g., any WTRU) involved in performing one or more of the following: hosting the application function (e.g., XR application) from which a request for any of XR actions may be received; receiving the request for an XR action from an application function located in network (e.g., edge server, remote server); initiating discovery procedure for determining other WTRUs/devices/nodes in proximity for performing an XR action (e.g., any XR actions) in a collaborative group; and/or establishing a session (e.g., XR session, PDU session, application session), for example, by sending/receiving a request for a session establishment and operating as the primary anchor point for communicating with a RAN function/node (e.g., gNB), CN function and/or application function, which may include sending and/or receiving (e.g., any) session related messages (e.g., capability transfer, assistance info transfer, configuration transfer, measurement info, XR action status info, session activation/deactivation, session release). If (e.g., when) supporting a connection to the network, the interface between an anchor WTRU and the network (e.g., gNB) may be referred to as primary Uu link.

A collaborative WTRU (e.g., in the context of collaborative XR), may refer to a WTRU (e.g., any WTRU) involved in performing one or more of the following: initiating discovery procedure and/or receiving a request for making the WTRU discoverable (e.g., via sidelink or via the network) for performing XR actions (e.g., any of the XR actions); if (e.g., when) supporting a connection to the network, the interface between the collaborative WTRU and the network (e.g., gNB) may be referred to as secondary Uu link; sending information related to XR actions (e.g., pose information; FoV parameters, such as direction, width of FoV, and other FoV metadata; UP data containing the captured/mapped FoV content; and/or media/video frames, assistance info, status info) directly to network (e.g., gNB, CN function, application function) and/or indirectly to the anchor WTRU; receiving information (e.g., RRC configuration information, application configuration information), which may be used for determining the XR actions (e.g., any of the XR actions), for example, possibly along with the anchor WTRU; and/or sending XR action related messages/reports to the anchor WTRU and/or network (e.g., including pose and/or FoV measurements and estimates) over sidelink interfaces (e.g., NR sidelink, Bluetooth, WiFi Direct). A collaborative WTRU may be associated with different collaborative groups and anchor WTRUs The terminology related to multi-modality may refer to an association (e.g., any association) between multiple flows and/or multiple WTRUs, for example, possibly in a collaborative WTRU group, which may be associated to support an application/service common to one or more WTRUs.

The terminologies used herein related to anchor UE and collaborative UE are non-limiting examples. Other terminologies that may be used when referring to an anchor WTRU may include central WTRU, primary WTRU, main WTRU, initiating WTRU, etc. Other terminologies that may be used when referring to collaborative WTRU may include assisting WTRU, supporting WTRU, secondary WTRU, etc.

The different attributes (e.g., as described herein, for example, including collaborative group, anchor WTRU, collaborative WTRU and XR actions) may be associated with different identifiers/IDs (e.g., a collaborative group ID, a per-group anchor WTRU ID, a per-group collaborative WTRU ID, XR action ID, etc.). The different identifiers/IDs associated with collaborative XR may be assigned/configured, for example, by one or more of the following: a WTRU, the network, an application function.

A tertiary WTRU may be a type of WTRU, for example, that may be associated with a role in the collaborative group and functional capabilities (e.g., similar to the secondary WTRU). The tertiary WTRU may be involved in XR action for a shorter duration and/or for a smaller partial task, and as a result may require a partial configuration (e.g., may take less time to complete or perform an XR action and/or with less overhead).

Methods for supporting dynamic and coordinated power saving schemes in multi-modal XR services may be enabled.

Figure 3:
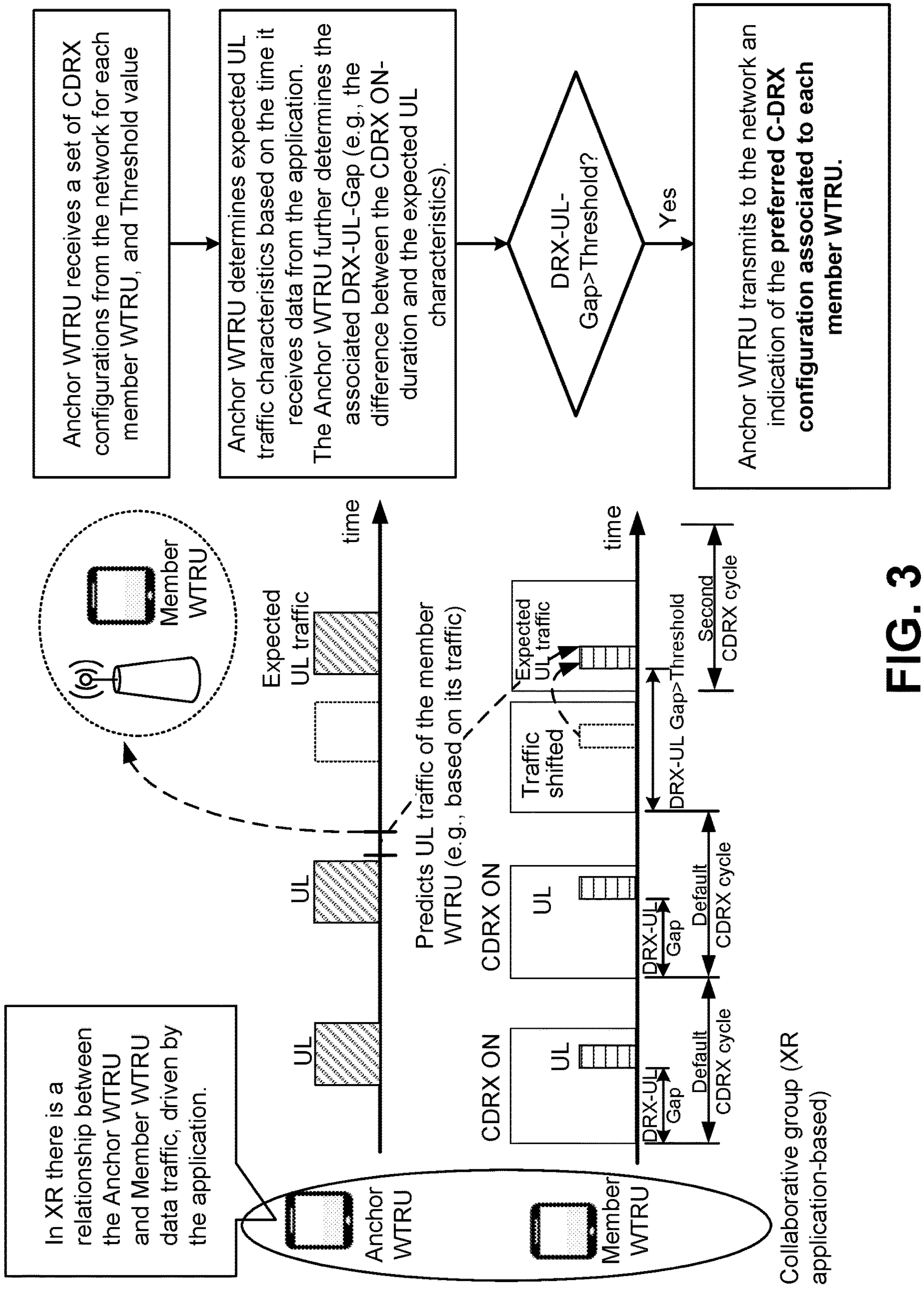
FIG. 3 illustrates an example flow of a collaborative WTRU group adapting CDRX parameters for power savings.

In examples, a WTRU in a collaborative WTRU group associated with an application/experience, may dynamically change parameters (e.g., the configurations) associated with one or more power saving schemes that may result in coordinated power savings and/or data reception/transmission in the group. FIG. 3 illustrates an example flow of a collaborative WTRU group adapting CDRX parameters for power savings.

The WTRU (e.g. anchor WTRU) may assist the network and/or indicate to other WTRUs in a collaborative WTRU group, information that may be used to ensure the selection of a configuration/parameter set that may be suitable in terms of power saving (e.g., for a time duration/period), for example, if (e.g., when) the WTRUs receive data/PDUs in DL (e.g., receiving a set of CDRX configurations for member WTRUs and threshold values for the member WTRUs, as shown in FIG. 3.

In examples, the WTRU may use information/indications (e.g., received from the application/higher layer) and/or information regarding the traffic association/dependency across the different flows (e.g., associated with the application), for example, to determine or predict some aspect of the subsequent the data/PDUs or sets of PDUs that may be expected to be transmitted and/or received by one or more WTRUs supporting an application in the collaborative WTRU group (e.g., determining UL traffic associated with a member WTRU, as shown in FIG. 3).

In examples, the WTRU may indicate to the network one or more parameters which may be used in (e.g., any of) the power saving schemes (e.g., CDRX) applied in any of the WTRUs in the collaborative WTRU group for ensuring power savings (e.g., optimal power savings) at the group level (e.g., all WTRUs in collaborative group incur appropriate power consumption and/or experience maximum power savings) at a given time. The WTRU may be triggered to indicate to the network (e.g., parameters/configurations for power savings), for example, based on the prediction or determination of some aspects of the PDUs or sets of PDUs the one or more WTRUs expect to receive in one or more flows over a given period of time.

In examples, the WTRU (e.g. anchor WTRU) may provide the network with information containing the predicted aspects of PDUs or sets of PDUs the WTRU expects, e.g., based on which the network may determine suitable power saving schemes/configurations for one or more WTRUs in a collaborative WTRU group. The WTRU may predict aspects of the next PDU(s) (e.g., expected UL traffic information) in one or more flows based on previously received PDUs, for example, in single flow or multiple flows associated with a (e.g., any) WTRU in the collaborative WTRU group and/or expected to be received by a (e.g., any) WTRU in the collaborative WTRU group. Aspects of the next PDU(s) (e.g., which may be determined by the WTRU) may include (e.g., without excluding others) a packet size, an expected arrival time of packet and duration, etc., for example.

The parameters (e.g., possible combination of parameters) may be associated with different power saving schemes/configurations that may be used in different WTRUs in a collaborative WTRU group, for example, including DRX/CDRX, PDCCH monitoring instances, usage of BWPs with variables sizes, etc.

For example, a WTRU receiving a PDU in multiple (e.g., two) data flows associated with an XR application may adapt its DRX/CDRX parameters (e.g., drx-onDurationTimer, drx-SlotOffset, etc.), for example, to achieve power saving (e.g., appropriate power saving) while fulfilling a joint QoS requirement for the PDUs in the different data flows (e.g., time difference for receiving the PDUs in different data flow is below a threshold).

The joint QoS requirement (e.g., if/when receiving/transmitting data/PDUs in multiple flows) may be applicable for (e.g., any of) the QoS metrics, for example, including latency, data rate, and/or reliability. In the case of a joint QoS requirement corresponding to data rate, the PDUs in one or more associated flows may be considered to fulfil the joint QoS, for example, if (e.g., when) the PDUs are transmitted and/or received by one or more WTRUs in the collaborative group with the data rate values associated with the individual flows and (e.g., at least) a joint minimum or a joint maximum data rate values associated with the one or more flows associated with the application. For the joint QoS bound corresponding to latency, the PDUs in one or more associated flows may be considered to fulfil the joint QoS, for example, if (e.g., when) the PDUs are transmitted and/or received by the WTRUs within the latency bounds (e.g. PDB) associated with the individual flows and (e.g., at least) within a joint minimum or a joint maximum latency bound associated with the one or more flows belonging to the application.

PDUs in different associated flows may fulfil (e.g., need to fulfil and/or be required to fulfil) a joint QoS requirement (e.g., to avoid a drift condition where the PDUs in the different associated data flows may drift from one another). A WTRU may consider the association and/or dependency of the PDUs between the different flows, for example, for determining/selecting suitable parameters in one or more power saving schemes/configurations. However, if the association between the PDUs in the different flows is not considered, a static parameter setting for power saving scheme(s)/configuration(s) may favor (e.g., always favor) towards the flow and/or the WTRU which has the most stringent requirement (e.g., in terms of latency or data rate). This may result in one or more WTRUs in the collaborative WTRU group remaining awake (e.g., all the time). WTRUs in the collaborative WTRU group may be enabled (e.g., as described herein) to minimize the occasions for remaining awake when receiving data in one or more flows and maximizes power savings in the WTRU group.

In examples (e.g., as described herein), the network may include one or more of a base station (e.g., gNB, TRP, RAN node), core network function, and/or an application function (e.g., edge server function, remote server function). Flows (e.g., as described herein) may correspond to one or more of the following: QoS flows or data flows (e.g., flow of data or PDUs, which may be associated with one or more QoS requirements, e.g. latency, data rate, reliability).

The WTRU may receive information (e.g., from application/higher layers) indicating an association between flows/other WTRUs.

In examples, the WTRU may receive (e.g., explicit or implicit) information (e.g., from application/high layers/network) for assisting/indicting the association between different data flows and/or between different WTRUs (e.g., which may belong to a collaborative WTRU group). Such information may be received, for example, periodically or aperiodically/dynamically (e.g., via RRC signaling, MAC CE signaling, DCI, NAS-layer signalizing, or application layer signaling).

The information received by the WTRU for identifying the association between data flows may include (e.g., a combination of) one or more of the following: identifiers/IDs associated with flows and/or application(s), priority/importance information associated with the flow(s), temporal/timing information in the associated flow(s), spatial/pose information in the associated flow(s), etc.

The information received by the WTRU for identifying the association between data flows may include identifiers/IDs associated with flows and/or application. For example, the WTRU may determine that multiple (e.g., two or more) flows may be associated with an application, for example, if (e.g., when) the WTRU detects an ID (e.g., common ID) associated with the application within the PDUs (e.g., in the header and/or payload) of a first flow and a second flow. The ID of the application may be preconfigured in the WTRU, for example.

The information received by the WTRU for identifying the association between data flows may include priority/importance information associated with flows. For example, the WTRU may determine that multiple (e.g., two or more) flows may be associated with an application, for example, based on a detection of indications (e.g., common and/or similar priority/importance indications) in the PDUs (e.g., in the header and/or payload) of a (e.g., each) flow. In examples, the WTRU may determine the flows may be associated, for example, if (e.g., when) the indications (e.g., priority/importance indications) detected by WTRU (e.g., in the PDU header or payload) are above/below one or more priority/importance threshold values.

The information received by the WTRU for identifying the association between data flows may include temporal/timing information in associated flows. In examples, the WTRU may determine that multiple (e.g., two or more) flows may be associated, for example, based on the format and/or granularity (e.g., common format and/or granularity) of the timing information (e.g., timestamps) carried in the PDUs associated with each flow.

The information received by the WTRU for identifying the association between data flows may include spatial/pose information in associated flows. For example, the WTRU may determine that multiple (e.g., two or more) flows may be associated, for example, if (e.g., when) the PDUs carrying the spatial information correspond to common spatial parameters. The spatial parameters, for example, may include one or more of the following: direction/orientation of FoV of the user/WTRU/devices, slice/tile of the video/media frame, location information (e.g., coordinates), pose information, etc. The spatial parameters may be determined by the WTRU, for example, based on a detection of PDUs (e.g., certain PDUs) transporting spatial information (e.g., pose/control PDU which may be identified by WTRU based on data type identifiers) or detection of other PDUs which may contain spatial information within the PDUs (e.g., in the header and/or payload).

If an XR application is running in a collaborative WTRU group, the WTRU may receive an identifier/ID associated with collaborative group (e.g., a group ID associating the WTRU to a common XR experience) and/or an identifier/ID associated with anchor WTRU (e.g., a WTRU in a collaborative WTRU group may receive information/ID regarding the anchor WTRU).

The identifiers/IDs (e.g., different identifiers/IDs) associated with collaborative XR may be assigned/configured (e.g., via RRC signaling, MAC CE signaling, a control PDU, DCI, application/NAS layer signaling), for example, by one or more of the following: an anchor WTRU, the network, an application function.

The WTRU may send information (e.g., to the network) for supporting data communication and power saving in a collaborative WTRU group.

In examples, the WTRU may send information to the network associated with data communications (e.g., for receiving/transmitting data in one or more flows) and power savings. Such information may be applicable for supporting communications and power savings for one or more WTRUs in a collaborative WTRU group, for example. Such information may be sent, for example, periodically or aperiodically/dynamically (e.g. based on detection of an event as described herein). The information may be sent, for example, as assistance information and/or as a status indication. The WTRU may send the information to the network, e.g., via AS layer signaling (e.g., RRC signaling and/or messages, MAC CE signaling, a control PDU, or UCI) or non-AS (NAS) layer signaling (e.g., PDU session related messages).

In examples, the information sent by WTRU may include a combination of one or more of the following: application(s) supported by the WTRU (e.g., associated with the collaborative WTRU group; the anchor WTRU's ID, IDs of the collaborative WTRU, and/or a collaborative group ID (e.g., in the case of a collaborative WTRU group); data flow(s) per WTRU associated with the application; data/traffic types associated with the data flows per-application; traffic characteristics and/or parameters of the data/traffic associated with the data flows per application and/or per-WTRU; preferred power saving schemes/configurations; etc.

The information sent by WTRU may include applications supported by the WTRU (e.g., associated with the collaborative WTRU group). For example, the WTRU may send the number and/or IDs associated with the applications supported. The WTRU may (e.g., additionally and alternatively) send information on the relative/absolute priority values associated with the supported applications.

The information sent by WTRU may include data flows per WTRU associated with the application. For example, the WTRU may send the number and/or IDs associated with the data flows supported per-application and per-WTRU. The WTRU may (e.g., additionally and/or alternatively) send information on the priority values (e.g., relative/absolute priority values) associated with the data flows.

The information sent by WTRU may include data/traffic types associated with the data flows per-application. For example, the WTRU may send information on data type carried by different flows associated with an application in each WTRU, including for example, video data (e.g., I-frame data, P-frame data, B-frame data), RGB-D data, 360 degrees video data, haptics data, pose/positioning data, audio data, etc.

The information sent by WTRU may include traffic characteristics and/or parameters of the data/traffic associated with the data flows per-application and/or per-WTRU. For example, the WTRU may send information on characteristics of the single or multiple data flows associated with the application. The information on characteristics of the single of multiple data flows associated with the application may include whether the data in each flow is periodic, aperiodic, semi-persistent, quasi-periodic, etc. For example, the WTRU may send information on the number of PDUs expected per ADU in one or more flows per-application and/or per-WTRU. The information on number of PDUs per ADU may (e.g., additionally and/or alternatively) include statistical information (e.g., such as mean, min, max, standard deviation values). For example, the WTRU may send the QoS requirements (per-PDU and/or per-ADU) of the one or more flows per WTRU associated with application, which may include the data rate, latency, reliability, absolute/relative priority values, etc.

The information sent by WTRU may include preferred power saving schemes/configurations (e.g., the anchor WTRU may transmit, to a network, an indication of preferred C-DRX configurations/parameters associated with a member WTRU, as shown in FIG. 3). For example, the WTRU may send to the network one or more preferred power saving schemes/configurations (e.g. CDRX). The one or more preferred power saving schemes/configurations may include parameters (e.g., specific parameters) associated with the configurations (e.g., ON-duration, inactivity timer, short/long DRX cycle) for one or more data flows and/or one or more WTRUs in a collaborative WTRU group. The WTRU may associate and/or indicate weight/probability values to different power saving schemes/configurations, for example, if (e.g., when) sending a request related to preferred configurations and/or parameters. In this case, the weight/probability value may be determined, for example, based on the likelihood of a configuration to be applied during data reception. The network may use the weight/probability information, for example, for determining and providing to the WTRU a combined configuration and/or for activating/deactivating a configuration that may match with the weight values indicated by WTRU.

The WTRU may send to the network the information (e.g., as described herein), for example, if (e.g., when) the WTRU detects one or more of the following (e.g., events): connectivity/session establishment and/or (re) configuration; changing/updating data flows per application and/or per WTRU; receiving higher layer/application information; change in measurements and/or movements in a WTRU; change in time/timing attributes (e.g., due to data reception/transmission and/or usage of any power saving schemes); changing power saving schemes/configurations; etc.

The WTRU may send to the network the information (e.g., as described herein), for example, if (e.g., when) the WTRU detects connectivity/session establishment and/or (re) configuration. For example, the WTRU may send to the network the information during connectivity/session establishment and/or (re) configuration (e.g., during RRC connection, PDU session, application session establishment and/or (re) configuration; if/when changing RRC state in (e.g., any) of the WTRUs in the collaborative WTRU group).

The WTRU may send to the network the information (e.g., as described herein) if (e.g., when) changing/updating data flows per application and/or per WTRU, such as, for example, one or more of the following: if (e.g., when) adding (e.g., new) flows and/or releasing existing flows associated with an application; or if (e.g., when) adding a WTRU (e.g., a new WTRU) in a collaborative WTRU group and/or if (e.g., when) a WTRU is released from the collaborative group.

The WTRU may send to the network the information (e.g., as described herein) if (e.g., when) receiving higher layer/application information, for example, if (e.g., when) receiving an indication (e.g., from an application function hosted in the WTRU or in the network) indicating change in data types supported, traffic characteristics, QoS requirements, etc.

The WTRU may send to the network the information (e.g., as described herein) if (e.g., when) detecting change in measurements and/or movements in a WTRU. For example, a change in measurements and/or movements in a WTRU may be detected if (e.g., when) the RSRP, RSRQ, RSSI measurements of the signals, channels, radio links, carriers, etc., possibly associated with the one or more data flows, are above/below threshold values. For example, a change in measurements and/or movements in a WTRU may be detected if (e.g., when) pose/positioning measurements (e.g., location information, pose in 6DoF) are above/below pose threshold values.

The WTRU may send to the network the information (e.g., as described herein) if (e.g., when) detecting a change in time/timing attributes (e.g., due to data reception/transmission and/or usage of any power saving schemes). For example, a WTRU may send information periodically or if (e.g., when) a time (e.g., via a timer) associated with sending of assistance information is set and/or expires. For example, the WTRU may send information if (e.g., when) the duration of time for which multiple (e.g., two or more) flows are associated expires. For example, the WTRU may send information if (e.g., when) the duration of time for which one or more WTRUs within the collaborative group are expected to remain awake and/or go to sleep expires.

The WTRU may send to the network the information (e.g., as described herein) if (e.g., when) changing power saving schemes/configurations. Changing power saving schemes/configurations may occur, for example, if (e.g., when) changing/updating one or more parameters associated with the power saving schemes/configurations used in one or more WTRUs in the collaborative WTRU group The WTRU may receive configuration information from the network associated with power saving schemes applicable for group of flows/WTRUs (e.g., configuration information associated with member WTRUs in a collaborative group).

In examples, the WTRU (e.g. anchor WTRU), may receive configuration information from the network based on which the WTRU may assist the network for selecting suitable power saving schemes/configurations/parameters for one or more WTRUs in a collaborative WTRU group, e.g., if (e.g., when) receiving PDUs in a single or multiple flows. The configuration information received by the WTRU may include (e.g., as shown in FIG. 3) one or more of the following: set(s) of parameters (e.g., possible parameters) for power saving scheme(s)/configuration(s) (e.g., for respective member WTRUs in a collaborative group); threshold value(s) related to expected packet size; threshold value(s) related to a time offset to begin reception (e.g., associated with a set of parameters for a member WTUR); threshold value(s) relative to a relevance time; threshold value(s) related to a joint QoS; time thresholds related to time drift; etc.

The configuration information received by the WTRU may include set(s) of parameters (e.g., possible parameters) for power saving schemes/configurations. For example, the WTRU may receive a first set of parameters (e.g., initial and/or default set of parameters) and one or more sets of additional parameters (e.g., possible parameters), e.g., that may be used for adapting the power saving scheme (e.g. CDRX) to aspects of the PDUs (e.g., that the WTRU may be expecting to receive from a transmitting entity (e.g., base station) in one or more flows). For example, the sets of parameters may include one or more of the following: DRX functionality (e.g., drx-onDurationTimer, drx-ShortCycle, drx-SlotOffset, drx-InactivityTimer, etc.); and/or PDCCH monitoring (e.g., search space sizes, BWP sizes, number of active carriers, etc.). In examples, the WTRU may (e.g., additionally) receive the first configurations (e.g., initial/default configurations, initial/default set of parameters) including one or more BWPs and associated PDCCH SS group or groups per CORESET in each configured BWP per WTRU (e.g., for one or more WTRUs in a collaborative WTRU group). In examples, a WTRU may receive time durations/periods for use of a first/default power saving scheme (e.g., before switching to a second power saving scheme) for the one or more WTRUs in the collaborative WTRU group. The time durations for switching between different power saving schemes may be different for different WTRUs.

The configuration information received by the WTRU may include threshold value(s) related to expected packet size. For example, the WTRU may receive the first threshold values (e.g., initial/default threshold values) for one or more WTRUs in a collaborative WTRU group and/or additional threshold values per-WTRU associated with the expected size of the PDUs (e.g., that are yet to be received from the transmitting entity (e.g., base station) in one or more flows per-WTRU). The expected size of the PDUs per-WTRU may indicate (e.g., indirectly indicate) the expected data rate for the PDUs and/or the duration of time for receiving (e.g., required to receive) the PDUs per-WTRU.

The configuration information received by the WTRU may include threshold value(s) related to a time offset to begin reception or a time offset to begin transmission (e.g., as shown in FIG. 3). For example, the WTRU may receive the first threshold values (e.g., initial/default threshold values) for one or more WTRUs in a collaborative WTRU group and/or additional threshold values per-WTRU associated with the time offset on when the WTRUs may expect to start receiving PDUs (e.g., expected traffic) or associated with a time offset on when the WTRUs may expect to start transmitting PDUs to a receiving entity (e.g., base station) in one or more flows from the transmitting entity (e.g., base station).

The configuration information received by the WTRU may include threshold values related to relevance time. For example, the WTRU may receive the first threshold values (e.g., initial/default threshold values) for one or more WTRUs in a collaborative WTRU group and/or additional threshold values per-WTRU associated with the duration of time the PDUs in one or more flows per-WTRU associated with the XR application and/or relevant to the XR application.

The configuration information received by the WTRU may include threshold values related to the joint QoS. For example, the WTRU may receive the first threshold values (e.g., initial/default threshold values) for one or more WTRUs in a collaborative WTRU group and/or additional threshold values per-WTRU associated with the joint QoS requirement on the PDUs in multiple (e.g., two or more) flows received by (e.g., any of) the WTRUs in the collaborative WTRU group. The joint QoS requirement on the PDUs in multiple (e.g., two or more) flows may be related, for example, to the joint latency bound associated with the time difference between the reception time of a PDU in a first flow and another PDU in a second flow.

The configuration information received by the WTRU may include threshold values related to time drift. For example, the WTRU may receive set(s) of time drift threshold values. The time drift threshold values may be related to a time drift from an expected value(s) (e.g., expected arrival time of packet and duration), for example, as a result of prediction error. The threshold values may be used as a triggering point, for example, if (e.g., when) the WTRU (e.g., anchor WTRU) is expected to send an indication to the network.

The WTRU (e.g. any WTRU in a collaborative WTRU group) may receive the configuration information, for example, via AS layer signaling (e.g., RRC signaling/messages, MAC CE signaling, or DCI) or non-AS (NAS) layer signaling (e.g., PDU session related messages).

The WTRU may monitor a PDCCH for receiving PDUs in one or more flows based on dynamically updated power saving configurations.

In examples, a WTRU (e.g. anchor WTRU in a collaborative WTRU group) may send information to the network indicating the set of parameters (e.g., preferred set of parameters) associated with one or more power saving schemes (e.g., for one or more WTRUs in collaborative group). The set of parameters for the power saving schemes may be configured, for example, if (e.g., when) performing PDCCH search and/or receiving PDUs associated with one or more data flows with a joint QoS requirement.

In an example, the WTRU may receive configuration information from network including one or more configurations/parameters such as a primary threshold boundary and/or a secondary threshold boundary. For example, the primary threshold boundary may be associated with an initial/default/first set of power saving schemes/configurations for one or more WTRUs in the collaborative WTRU group. The initial/default/first set of power saving schemes/configurations may include an anchor WTRU, which may be used if (e.g., when) performing PDCCH search and/or receiving PDUs in one or more flows per WTRU from a transmitting entity (e.g., base station). The parameter values associated with the primary threshold boundary may include one or more of the flowing aspects of the PDUs, for example, such as a packet size value (e.g., maximum packet size value), a time offset to begin reception of a PDU (e.g., minimum time offset to begin reception of a PDU), a duration of time for receiving a PDU (e.g., maximum duration of time for receiving a PDU), a time (e.g., minimum time) associated with joint latency bound for PDUs in multiple flows, a duration (e.g., maximum duration) of time (e.g., based on expiration of a timer) for using a default set of parameters for power saving functionalities, etc. For example, a secondary threshold boundary may be associated with a second set of power saving schemes/configurations for one or more WTRUs in the collaborative WTRU group, which may be used for achieving (e.g., optimal) power saving when performing PDCCH search and/or receiving PDUs in one or more flows from a transmitting entity (e.g., base station). The parameter values associated with the secondary threshold boundary may be the same or different than those applied for the primary threshold boundary, for example.

After receiving the configuration information, the WTRU (e.g. anchor WTRU) may receive the first set of PDUs in one or more data flows from a transmitting entity (e.g., base station, member WTRU), for example, based on an initial and/or default power saving configuration (e.g., CDRX) for power saving. The WTRU may identify that the PDUs received in one or more flows may belong to an application/experience (e.g., XR application) supported by the WTRUs in the collaborative WTRU group, for example, based on the identifiers/IDs detectable in the PDUs' header.

The WTRU (e.g. anchor WTRU) may use information (e.g., spatial information, pose information, temporal information) acquired from the first set of PDUs in one or more flows and/or the information regarding the association and/or dependency of the flows (e.g., PDUs in the second flow may be triggered by PDUs in the first flow), for example, to determine and/or predict aspects of the subsequent set of PDUs the WTRU expects to receive in one or more flows. Aspects of the PDUs the WTRU may predict may include any of the following: a size of the PDUs; an offset time to begin DL reception for PDUs in one or more flow; a time offset to begin reception of PDU/PDUs across multiple flows; a duration of time for reception of PDU/PDUs; etc.

Based on the received configuration information and the predicted information regarding the PDUs in one or more flows expected to be received, the WTRU may perform one or more of the following.

Based on the received configuration information and the predicted information regarding the PDUs in one or more flows expected to be received, the WTRU may determine a (e.g., any) change in one or more aspects (e.g., timing associated with expected traffic) of the PDUs that may be expected to be received by the WTRU or other WTRUs in the collaborative WTRU group (e.g., as shown in FIG. 3). The change in aspects of the PDUs expected may correspond to, for example, an increase or decrease in the size of the PDUs per WTRU expected in one or more flows, an increase or decrease in the number of flows in the XR application, an increase or decrease in the time offset to begin reception of PDUs in one or more flows per WTRU (e.g., based on determining a duration and/or timing information associated with expected UL traffic), and/or an increase or decrease in the difference between the time offset to begin reception of PDUs across two or more flows.

Based on the received configuration information (e.g., threshold associated with duration and timing information for expected UL traffic) and the predicted information regarding the PDUs in one or more flows expected to be received (e.g., duration and timing information associated with the expected traffic), the WTRU may be (e.g., based on the predicted change in aspects of the PDUs expected to be received in one or more flows and according to the configured primary and secondary thresholds) triggered to perform one or more actions to dynamically change its optimal power saving scheme and/or coordinate power saving scheme for usage in the collaborative WTRU (e.g., sending an indication indicating a preferred set of parameters). For example, as shown in FIG. 3, the anchor WTRU may determine a duration (e.g., difference in time between a CDRX ON-duration associated with a first set of parameters and the expected UL traffic characteristics (e.g., DRX-UL-Gap)). The WTRU may determine that the duration exceeds the threshold associated with the member WTRU.

Based on the received configuration information and the predicted information regarding the PDUs in one or more flows expected to be received, the WTRU may maintain the initial and/or default power saving scheme, for example, if the predicted changes in aspects of the expected PDUs fall within the primary threshold, e.g., in which case the WTRU may refrain from sending (e.g., not send) an (e.g., any) indication to the network or may send in an indication that the default power saving scheme is applied.

Based on the received configuration information and the predicted information regarding the PDUs in one or more flows expected to be received, the WTRU may be (e.g., if the changes in aspects of the PDUs expected to be received by the WTRU fall outside the primary threshold (e.g., fall within secondary or another threshold boundary)) triggered to perform one or more of the following actions, for example. The WTRU may send an indication to the network indicating the optimal set of DRX parameters (e.g., drx-onDurationTimer, drx-ShortCycle, drx-SlotOffset, drx-InactivityTimer) that the WTRU or other WTRUs in the collaborative WTRU group may be configured with (e.g., in preference over the default DRX configuration), for example, as shown in FIG. 3. The network may respond by changing the default DRX configuration (e.g., to a device or cell specific DRX) for the WTRU in the collaborative WTRU group. The WTRU may send an indication to the network indicating a number (e.g., the preferred number) of carriers per WTRU, e.g., which may enable any of the WTRUs to increase its power saving capability by reducing the BWP size. The network may choose to switch the active BWP for any of the WTRUs in the collaborative WTRU group to a BWP that is much narrower (e.g. for power saving purposes). The WTRU may activate/deactivate a secondary cell and/or switch the BWP in one or more WTRUs in the collaborative WTRU group. In examples, the WTRU (e.g. anchor WTRU) may adjust PDCCH monitoring activity for the collaborative group based on this activation/deactivation.

Based on the received configuration information and the predicted information regarding the PDUs in one or more flows expected to be received, the WTRU may (e.g., after sending the indication) receive an indication from network (e.g., via RRC signaling, DL MAC CE signaling, DCI), which may confirm the switching to the indicated power saving schemes in (e.g., any of) the WTRUs in the collaborative WTRU group. The indication received by the WTRU may include the WTRU IDs and/or the corresponding PS scheme IDs for which the switching is confirmed. In the case of an XR application running in a collaborative WTRU group, the indication may be received by the anchor WTRU and/or one or more other WTRUs in the collaborative WTRU group. If the indication is received (e.g., only received) by the anchor WTRU (e.g. with a flag indicating the that the indication is only sent to anchor WTRU and/or not to other WTRUs), the anchor WTRU may convey the updated set of DRX parameters (e.g., via SL) to the other WTRU in the collaborative WTRU group.

In examples (e.g., which may be applicable to XR application using a single flow or multiple flows in one or more WTRUs in the collaborative WTRU group) the WTRU may track a duration of time (e.g., initiate a timer) during which period it chooses to not monitor (e.g., refrains from monitoring) PDCCH in a configured DRX cycle (e.g., in ON duration), for example, until it receives an explicit indication (e.g., via DCI) to do so. If the XR application is running in a (e.g., single) WTRU, the WTRU may revert to normal PDCCH monitoring after a number of DRX cycles (e.g., a number of DRX cycles above/below a threshold), for example, based on a time (e.g., expiration of a timer). If the XR application is running in one or more WTRUs in a collaborative WTRU group, the anchor WTRU may indicate (e.g., via SL) to one or more WTRUs to revert to normal PDCCH monitoring after a number of DRX cycles (e.g., a number of DRX cycles above/below a threshold), for example, based on a time (e.g., expiration of a timer) corresponding to each WTRU in the group. The time (e.g., timer) may be set based on, for example, when receiving the last PDCCH (e.g., triggered when receiving the last PDCCH) and/or a counter in the WTRU indicating how many DRX cycles may be skipped before normal PDCCH monitoring resumes.

In examples (e.g., applicable to one or more WTRUs in a collaborative WTRU group) the WTRU may (e.g., expect to) receive an explicit indication from the network (e.g., via a wake up signal (WUS) or go to sleep signal) indicating to monitor a PDCCH. The indication may be associated with single/multiple and/or long and/or short DRX cycles. A WTRU may refrain from (e.g., may not) monitor/skip monitoring PDCCH in an ON duration, for example, unless it receives a wake-up signal prior to the start of the DRX cycle. The WTRU (e.g., alternatively) may (e.g., expect to) be indicated (e.g., explicitly indicated) to refrain from monitoring (e.g., not monitor) a PDCCH in one or several DRX cycles (e.g., via a go-to-sleep signal). This behavior may apply to multiple DRX cycles (e.g., a number of DRX cycles above/below a threshold). The WTRU (e.g. anchor WTRU) may receive (e.g., expect to receive) an implicit (e.g., based on predicted aspects of the expected PDUs) or explicit (e.g., via DCI) indication to skip PDCCH monitoring in a secondary component carrier or secondary cell. For other WTRUs in the collaborative WTRU group, the WTRU may receive (e.g., expect to receive) an explicit indication from the anchor WTRU (e.g., via SL) to skip PDCCH monitoring in a secondary component carrier or secondary cell.

The WTRU may use timing information for switching between different PS schemes for the WTRUs in collaborative group.

In examples (e.g., applicable to a collaborative group of WTRUs), the anchor WTRU may determine the power saving scheme for another WTRU in the group, e.g., based on received data/indication in DL and information on an association (e.g., group ID) between the WTRUs in the collaborative group. The anchor WTRU may switch between power saving schemes (e.g., different available power saving schemes) and/or assist the network in switching between different power saving schemes for another WTRU in the group, for example, based on detection of interruption events (e.g., for receiving data in DL).

The WTRU (e.g. anchor WTRU) may receive configuration information from network, including one or more of the following: configuration information/parameters associated with one or more power saving (PS) schemes (e.g., CDRX, active BWP) that may be applied in the anchor WTRU and/or collaborative WTRU; and/or time durations/periods for use of a first (e.g., default) PS scheme (e.g., before switching to a second PS scheme) for the anchor WTRU and/or collaborative WTRU.

The WTRU (e.g. anchor WTRU) may receive configuration information from network, including configuration information/parameters associated with one or more PS schemes (e.g., CDRX, active BWP) that may be applied in the anchor WTRU and/or collaborative WTRU. The different PS schemes received by the WTRU may include (e.g., at least) a default/first PS scheme for each WTRU to be used in a first time duration, a second PS scheme for each WTRU to be used in a second time duration and a third PS scheme for each WTRU to be used when determining/detecting interruption events (e.g., jitter in DL is greater than a threshold). The WTRU may receive the IDs of the different PS schemes applicable for each WTRU, for example.

The WTRU (e.g. anchor WTRU) may receive configuration information from network, including time durations/periods for use of default/first PS scheme (e.g., before switching to the second PS scheme) for the anchor WTRU and collaborative WTRU. The time durations for switching between PS schemes may be different for different WTRUs, for example.

In examples, the WTRU (e.g. anchor WTRU) may use the first power saving scheme power saving scheme for receiving data in DL. The WTRU may start tracking a first time (e.g., via a timer) for keeping track of the duration for using the first power saving scheme. The WTRU may start tracking a second time (e.g., via another timer) for tracking the usage of the corresponding first PS scheme in the collaborative WTRU, for example.

Based on the data received in DL and/or any indications received from network or application, the WTRU may determine the presence of an (e.g., at least one) interruption event (e.g., jitter is greater than a threshold), based on, for example, an explicit indication (e.g., received from network/application) or an implicit indication (e.g., measurement of jitter when receiving data in DL).

The WTRU may switch to the second power saving scheme after a duration of time (e.g., via the expiry of the timer), for example, if the WTRU does not detect the presence of any interruption events (e.g., jitter). The WTRU may receive the data in DL using the second power saving scheme.

The WTRU (e.g. anchor WTRU) may send an indication to the network (e.g., indicating to switch to using the third PS scheme associated with an interruption event), for example, if the WTRU detects an interruption event and a (e.g., any) of the durations of times (e.g., via the timers) associated with the power saving schemes used for anchor WTRU and collaborative WTRU are still running. The indication sent by the WTRU (e.g., via an RRC message/signaling, UL MAC CE signaling, UCI) may indicate whether the switching to the third PS scheme may be applied (e.g., for both the anchor WTRU and the collaborative WTRU, for (e.g., only) the anchor WTRU, or (e.g., only) the collaborative WTRU. The indication may be determined by the WTRU, for example, based on the interruption event (e.g., amount of jitter) and/or whether the durations of time (e.g., via timers) associated with power saving schemes used in different WTRUs are being tracked (e.g., running) or expired. The WTRU may send (e.g., include) in the indication to the network the WTRU IDs and/or the corresponding power saving scheme IDs for which the switching may be applied.

After sending the indication, the WTRU may receive an indication from the network (e.g. via RRC signaling, DL MAC CE signaling, DCI) which may confirm the switching to the third power saving schemes in the different WTRUs. The indication received by the WTRU may include the WTRU IDs and/or the corresponding power saving scheme IDs for which the switching is confirmed. The WTRU may switch to the third power saving scheme for receiving the data in DL.

A WTRU may assist in mitigating time drift, for example, between the arrival of PDUs in DL and the configured power saving scheme.

In examples, the WTRU (e.g., anchor WTRU) may discover and/or detect a time drift. The WTRU may discover and/or detect a time drift between the actual time of arrival of PDUs (e.g., in relation to the expected time of arrival of the PDUs and the timing values in the configured power saving parameters). The time drift may occur because of jitter in the traffic. The time drift may occur because of a propagation of error. A propagation of error may occur if (e.g., when) the WTRU (e.g. anchor WTRU) determines and/or predicts aspects of the subsequent set of PDUs that the WTRU expects to receive in one or more flows. Such time drift may result in misalignment between the reception/transmission of PDUs in one or more flows and the configured power savings parameters in one or more power saving schemes/configurations (e.g. CDRX schemes/configurations). In examples, the WTRU (e.g. anchor WTRU) may send information (e.g., to the network) indicating an offset value. The offset value may be used to adjust the timing value, for example, to one or more of power saving parameters that a WTRU or group of WTRUs may be configured with.

The WTRU (e.g. anchor WTRU) and/or other WTRUs in the collaborative group may detect time drift between the arrival of PDUs and the time values in one or more of the configured power saving parameters. The WTRU (e.g. anchor WTRU) and/or other WTRUs in the collaborative group may detect time drift between the arrival of PDUs and the time values in one or more of the configured power saving parameters, for example, if the WTRU receives (e.g., after receiving) the primary/default or the secondary power saving configuration (e.g. CDRX configuration) from the network (e.g., via signaling, such as, RRC signaling, a DL MAC CE, DCI) and starts receiving PDUs (e.g., the time drift may occur soon after the WTRU receives the primary/default or the secondary power saving configuration and starts receiving PDUs). For example, the time drift could be between the arrival time of PDUs and one or more DRX/CDRX parameters such as one or more of the following: drx-onDurationTimer; drx-ShortCycle; drx-SlotOffset; etc.

In examples, the WTRU (e.g. anchor WTRU) and/or WTRUs in a collaborative WTRU group, may be configured with a threshold value. The threshold value may be related to the time drift, for example, based on which the WTRU (e.g. anchor WTRU) may be triggered to send an indication to the network regarding the time drift. The WTRU may send the indication to NW regarding the time drift (e.g., periodically), for example, based on a configured periodicity value. The WTRU may send an indication associated with the time drift, for example, if the WTRU receives (e.g., when receiving) a request message/indication from the network. In examples (e.g., associated with collaborative WTRU groups), a collaborative WTRU may (e.g., alternatively, instead) be triggered to send an indication regarding the time drift to the anchor WTRU (e.g. directly via SL or indirectly via the NW or via another WTRU).

In examples, the WTRU (e.g. anchor WTRU) and/or WTRUs in a collaborative WTRU group may receive additional information. The additional information may include one or more of the following: time drift threshold value(s) (e.g., corresponding to each set of power saving configuration parameters); a set of time offset values (e.g., incremental and/or decremental time offset values), for example, that may correspond to a (e.g., each) time drift threshold value and/or set of power saving configuration parameters.

The WTRU (e.g. anchor WTRU) and/or WTRUs in a collaborative WTRU group may receive additional information, for example, such as time drift threshold value(s)

corresponding to each set of power saving configuration parameters. A power saving scheme (e.g., configuration) with a relaxed set of parameters may allow longer time drift, for example, between the arrival time of a PDU and the power saving configuration time parameters (e.g., as compared to a power saving scheme/configuration with a set of shorter timing values).

The WTRU (e.g. anchor WTRU) and/or WTRUs in a collaborative WTRU group may receive additional information, for example, such as a set of time offset values (e.g., incremental and/or decremental time offset values) which may correspond to a (e.g., each) time drift threshold value and/or set of power saving configuration parameters based on which the WTRU (e.g. anchor WTRU) can adjust one or more parameters associating to its current power saving configuration before receiving the next batch of PDUs.

Based on the received configuration information and a value (e.g., current value) in time drift, a WTRU (e.g., anchor WTRU) may perform one or more of the following.

A WTRU (e.g., anchor WTRU) may maintain the set of parameters that the WTRU is configured with for power saving (e.g., based on the received configuration information and a value in time drift) The WTRU (e.g., anchor WTRU) may maintain the set of parameters that the WTRU is configured with for power saving, for example, if the time drift value between the time of arrival of the current PDU and the configured timing value in one or more of the power savings configuration set of parameters is below the corresponding time drift threshold value.

A WTRU (e.g., anchor WTRU) may indicate (e.g., to the network) time drift information (e.g., based on the received configuration information and a value in time drift). A WTRU (e.g., anchor WTRU) may indicate (e.g., to the network) time drift information, for example, if the time drift value between the time of arrival of the current PDU and the configured timing value in one or more of the power configuration set of parameters is above the corresponding time drift threshold value. The WTRU (e.g., anchor WTRU) may (e.g., additionally) indicate the corresponding incremental or decremental offset value or set of offset values, for example, that may be applied to adjust one or more values in the set of power saving configuration parameters (e.g., to accommodate the time drift in the arrival of the next batch of PDUs. A collaborative WTRU may send an indication regarding the time drift to the anchor WTRU (e.g., via SL), and the anchor WTRU may forward the indication regarding the time drift to the network. In case a WTRU or set of WTRUs in a collaborative WTRU group detects a time drift (e.g., a time drift above the threshold value corresponding to the set of power saving parameters the collaborative WTRU or WTRUs are configured with), the collaborative WTRU may send the indication regarding the time drift to the anchor WTRU (e.g., via SL) which in turn may forward it to the network.

The WTRU may receive an indication (e.g., from the network and/or anchor WTRU), for example, to adjust one or more configured parameters in the power saving scheme (e.g., configuration) set of parameters with the offset value or set of values. The WTRU (e.g., anchor WTRU and/or collaborative WTRU) may receive an indication (e.g. from the network and/or anchor WTRU) to adjust the one or more of the configured parameters in the power saving configuration set of parameters with the offset value or set of values, for example, if the WTRU sends (e.g., after sending) the information (e.g. to the network) related to the time drift and/or the incremental or decremental offset value or set of values.

The WTRU (e.g., anchor WTRU) may receive an indication from the network to switch back to a default set of power saving configuration parameters, for example, if (e.g., when) receiving the next one or more PDUs. In examples, the WTRU (e.g., anchor WTRU) may receive an indication from the network to switch back to a default set of power saving configuration parameters for receiving the next one or more PDUs, for example, if the detected time drift is above a threshold value (e.g., large and well above a threshold value). The WTRU (e.g., anchor WTRU) may (e.g., additionally) receive an additional indication (e.g., a request for assistance information or a request for a prediction message), which may instruct the WTRU to perform a prediction (e.g., an updated prediction) regarding aspects of the PDUs that are expected to be received. Depending on the changes in aspects of the PDUs expected to be received and the corresponding threshold, the WTRU (e.g., anchor WTRU) may then indicate to the network a set of power saving configuration parameters (e.g., a new optimal set of power saving configuration parameters) or maintain the default configuration.

The WTRU may assist in aligning schemes (e.g., CDRX schemes/configurations), for example, with respect to data transmissions and receptions in UL and/or DL scenarios.

In examples, a WTRU may assist in changing one or more configuration parameters of a power saving scheme (e.g., changing one or more configured parameters in CDRX) or changing to a different (e.g., new) power saving scheme/configuration (e.g., entirely different/new CDRX scheme/configuration), for example, based on a detection of changes to the motion-to-photon (MTP) or RTT latency during transmission and reception of PDUs in one or more flows. In examples, MTP latency may refer to the RTT when supporting interactive applications/services with HMD WTRU (e.g., from the time a user moves his head to the time when the user sees the display change). Components of MTP in a network-based split processing/rendering scenario may include processing in WTRU (e.g., encoding), UL transmission (e.g., WTRU to base station), upstream transport in a NW (e.g., base station to an application server), processing in network (e.g., rendering, encoding), downstream transport in a NW (e.g., application server to base station), DL transmission (e.g., base station to WTRU), and processing in a WTRU (e.g. decoding, display in HMD), for example. MTP latency may be measured. MTP latency may be measured between the transmission of a PDU (e.g., in UL during a first ON/active time duration of a power saving configuration, such as, CDRX configuration) and the reception of a PDU in DL (e.g., which may be associated with the UL PDU, for example, during a second ON/active time duration).

In examples, where a first PDU set (e.g. consisting of one or more PDUs) may be transmitted in UL (e.g., in a first ON/active time duration) and an associated second PDU set may be received in DL, the MTP latency may be measured as the time difference between the transmission of a first PDU in the first PDU set and the reception of the last PDU in the second PDU set. In examples, the first and second ON/active time durations (e.g., used during UL transmission and DL reception) may correspond to the same (e.g., a shared) extended ON/active time duration.

In examples, the WTRU may assist in changing one or more values in the set of parameters for power saving (e.g., one of more parameters in a CDRX configuration), for example, based on an observed traffic pattern in UL and DL. The traffic pattern observed by WTRU may refer to one or more traffic attributes, for example, including the type of data transmitted/received (e.g., pose data, I-frame data, P/B-frame data), the type of transmission/reception (e.g., periodic, semi-persistent, aperiodic), the number of associated flows in UL and/or DL, QoS parameters (e.g., PDU/PDU set delay budget, PDU/PDU set error rate, data rate), etc.

In examples, a WTRU may be configured by the network with one or more CDRX schemes (e.g., configurations), for example, based on assistance information associated with the traffic pattern and/or statistical information (e.g., average, standard deviation, minimum, maximum) related MTP latency in one or more flows. Assistance information may be provided to the network (e.g., serving base station) by the WTRU or by any of the CN entities (e.g., UPF, AMF, SMF), for example. The WTRU may provide the assistance information to network via signaling (e.g., such as via RRC signaling, in a MAC CE, or in UCI (e.g., PUCCH transmission), for example.

In examples, a WTRU may be configured with one or more BWPs, search spaces (SS) associated with the BWP(s), and/or association information (e.g., for determining the association between DL data and SS/BWPs). The configuration information may enable the WTRU to select a SS for receiving DL control messages (e.g., PDCCH transmissions), for example, based on the data transmission performed in UL. The WTRU may determine the data type transmitted in UL (e.g., I-frame or P/B-frame data), for example, based on monitoring of the indication/markings in the PDU header. The WTRU may predict the data type to be received in the DL, for example, based on the data type transmitted in UL. The WTRU may determine the SS in a configured BWP for receiving DL control messages (e.g., possibly containing DL resource assignments and/or UL grants), for example, based on the prediction of the DL data type and association information between DL data and SS/BWP. In examples, the WTRU may send an indication to network. The indication may indicate the prediction of data type in DL and/or BWP ID for receiving the DL data. The WTRU may receive an indication from network indicating the SS/BWP for receiving the predicted data in DL, for example.

In examples, the WTRU may be configured with one or more latency values (e.g., default MTP latency values) and/or thresholds (e.g., MTP threshold values), for example, that may correspond to a difference in latency (e.g., maximum or minimum difference in latency) from an default/average MTP latency value. The WTRU may monitor whether any change is detectable in the MTP latency (e.g., actual MTP latency), for example, based on measurements made on UL/DL traffic and/or the MTP threshold values. The WTRU may send an indication to network (e.g., indicating a change and/or the amount of change), for example, if (e.g., when) a change is detected (e.g., actual MTP is above/below the MTP threshold value). The WTRU may indicate the MTP change to the network via signaling (e.g., such as via RRC signaling, in a MAC CE, or in UCI (e.g., PUCCH transmission), for example.

In examples, the latency (e.g., default MTP latency) and/or threshold values (e.g., MTP threshold values) may be associated with one or more CDRX schemes (e.g., configurations). Such association information (e.g., which may be configured in the WTRU) may indicate the validity for using the CDRX configurations, for example, if (e.g., when) transmitting and/or receiving one or more PDUs within the MTP latency. The WTRU may determine that a CDRX scheme (e.g., configuration) may no longer be valid for transmission/reception of PDUs, for example, if (e.g., when) the MTP latency is above/below the configured MTP threshold values. In such scenarios, the WTRU may change the CDRX parameters/configurations and/or select different (e.g., new) CDRX parameters/configurations from a preconfigured set of parameters/configurations (e.g., that may be suitable with the expected MTP latency).

In examples (e.g., where the WTRU may change any of the CDRX parameter values and/or CDRX schemes/configurations), the WTRU may send an indication/request message to the network indicating one or more of the following: an ID/index of the requested parameter, a requested parameter value, an ID/index of the requested CDRX scheme/configuration (e.g., if/when the WTRU may be preconfigured with one or more CDRX configurations), etc. The WTRU may use the corresponding updated parameters or (e.g., new) CRDX configuration, for example, based on receiving an indication (e.g., confirmation indication or activation/deactivation indication) from the network. In examples, the WTRU may use (e.g., autonomously use) the indicated/requested (e.g., new) parameters or schemes (e.g., configurations), for example, based on (e.g., after) a duration of time (e.g., expiry of a timer), for example, after sending an indication to network. The WTRU may fallback to using a default/initial CDRX scheme (e.g., configuration) and/or a default set of parameters (e.g., possibly pre-configured in the WTRU), for example, if a rejection indication is received from the network.

In examples, a WTRU (e.g., which may be configured with an MTP threshold value) may perform a first measurement of MTP latency for a UL+DL cycle. Such measurement may include measuring of the time difference between transmission of a PDU of an UL flow and reception of PDU in an associated DL flow. The WTRU may perform the measurement, for example, if (e.g., when) configured with a first CDRX scheme (e.g., configuration). The WTRU may (e.g., additionally) determine the traffic pattern of the data transmitted in UL and/or received in DL (e.g., WTRU may determine whether data transmitted/received correspond to I-frame or P/B frame), for example, based on monitoring of the PDU headers. The WTRU may predict the traffic pattern for the subsequent (e.g., next) DL reception, for example, based on the data in UL transmission. The WTRU may (e.g., additionally) predict the traffic pattern in subsequent (e.g., the next) UL+DL cycle, for example, based on the traffic patterns observed in the previous one or more UL+DL cycles. The WTRU may predict the MTP latency for subsequent (e.g., the next one or more) UL+DL cycles, for example, based on the first measurement of MTP and/or the determined traffic pattern. The WTRU may determine a second CDRX scheme (e.g., configuration) or change one or more parameters of the first CDRX scheme/configuration (e.g., increase/decrease the ON/activate time duration) such that one or more of the changes may match/align with the predicted MTP latency, for example, if the predicted MTP latency is greater/lower than the configured MTP threshold value. The WTRU may select the parameters/configuration that may match/align with the predicted MTP latency, for example, if (e.g., when) preconfigured with a set of CDRX parameters/configurations. The WTRU may send an indication to network indicating one or more of the following: a predicted MTP latency for subsequent (e.g., the next) cycle(s), a predicted traffic pattern for the subsequent (e.g., next) DL data and/or subsequent (e.g., next) UL+DL cycle, determined/selected CDRX parameters and/or CDRX configurations (e.g., IDs), etc. In examples, such indication may be sent by the WTRU along with the UL data transmission, for example, via signaling (e.g., such as via RRC signaling, a MAC CE, or UCI). The WTRU may use a second CDRX scheme (e.g., configuration) or (e.g., new) CDRX parameters for receiving subsequent (e.g., next) DL data or for transmission/reception of data during subsequent (e.g., the next) UL+DL cycle(s), for example, based on (e.g., after) receiving an indication from network indicating (re) configuration/activation/deactivation of the CDRX configuration/parameters.

The WTRU may assist the network in changing monitoring occasions (e.g., PDCCH monitoring occasions), for example, according to data expected in DL.

In examples, the WTRU (e.g., anchor WTRU) may receive configuration information from the network which the WTRU may use to assist the network in selecting one or more configuration parameters used during PDCCH monitoring in the WTRU (e.g., anchor WTRU) and/or the set of WTRUs in a collaborating group (e.g., if/when receiving PDUs). The WTRU (e.g., anchor WTRU) may determine and/or predict one or more attributes associated with the PDUs expected in DL in one or more flows. The WTRU (e.g., anchor WTRU) can (e.g., using the determined and/or predicted attributes) determine the change to the set of configuration values for setting PDCCH monitoring occasions (e.g., PDCCH monitoring periodicity, duration, etc.) during a DRX ON time. The WTRU (e.g., anchor WTRU) and/or set of WTRUs in a collaborative group may (e.g., be able to) save power, for example, by eliminating (e.g., unnecessary) PDCCH monitoring instances and shortening PDCCH monitoring duration.

In examples, the WTRU (e.g. anchor WTRU) may use information (e.g., spatial information, pose information, temporal information) transmitted in UL, information acquired from the first set of DL PDUs in one or more flows, and/or information regarding the association and/or dependency of the flows (e.g., PDUs in the second flow may be triggered by PDUs in the first flow) to determine and/or predict attributes associated with the subsequent set of PDUs the WTRU expects to receive in one or more flows.

In examples, the WTRU (e.g., anchor WTRU) may send assistance information to the network for changing one or more values for adjusting the PDCCH monitoring occasion (e.g., PDCCH monitoring periodicity, PDCCH monitoring duration) for the WTRU (e.g., anchor WTRU) and/or set of WTRUs in a collaborative group, for example, based on the traffic information sent in UL and/or previously received DL PDUs and/or the traffic association information across multiple flows. The WTRU (e.g., anchor WTRU) may be able to determine some aspects of the PDUs expected in DL towards the WTRU (e.g., anchor WTRU) and/or set of WTRUs in a collaborative group, for example, after (e.g., based on) sending PDUs in UL in one or more flows and receiving the associated PDUs in DL (e.g., also) in one or more flows, for example, where the traffic association between flows may be known (e.g., determined) by the WTRU. The aspects of the DL PDUs the WTRU (e.g., anchor WTRU) may determine and/or predict may include may include PDU size, PDB, jitter, for example.

In examples, the WTRU (e.g., anchor WTRU) may receive configuration information including (e.g., consisting of) a default configuration and one or more additional configurations (e.g., default parameters and/or one or more additional parameters) related to PDCCH monitoring occasions for the WTRU (e.g., anchor WTRU) and/or set of WTRUs in a collaborative group, for example, based on the traffic information the WTRU (e.g., anchor WTRU) provides to the network. The WTRU (e.g., anchor WTRU) may receive the configuration information, for example, via signaling (e.g., AS layer signaling, e.g., RRC signaling/messages, MAC CE or DCI).

The WTRU (e.g., anchor WTRU) may receive configuration information (e.g., indicating multiple configurations) related to PDCCH monitoring occasions (e.g., monitoring periodicity, duration) and information on how the WTRU (e.g., anchor WTRU) and/or set of WTRUs in a collaborative group can determine the optimal PDCCH monitoring configuration (e.g., at a given time). In examples, the WTRU (e.g., anchor WTRU) may receive configuration information from the network including (e.g., consisting of) one or more threshold values associated with a primary (e.g., default) configuration and a secondary configuration for PDCCH monitoring occasions. The threshold values indicated to (e.g., configured in) the WTRU (e.g., anchor WTRU) may relate to one or more of the following: the PDB, joint PDB (e.g., in the case associated with multi flow traffic), and/or the packet sizes; and/or the expiry of a time (e.g., via a timer), for example, indicating to use a primary (e.g., default) configuration.

The threshold values indicated to (e.g., configured in) the WTRU (e.g., anchor WTRU) may relate to the PDB, joint PDB (e.g., in the case associated with multi flow traffic), and/or the packet sizes. The WTRU (e.g., anchor WTRU) may determine to change (e.g., increase or decrease) the periodicity and/or the duration of PDCCH monitoring occasions, for example, depending on the expected changes in the PDB in one or more flows and/or changes in the expected packet size.

The threshold values indicated to (e.g., configured in) the WTRU (e.g., anchor WTRU) may relate to the expiry of a time (e.g., via a timer), for example, using a primary (e.g., default) configuration. The WTRU (e.g., anchor WTRU) may receive configuration information indicating (e.g., be configured with) a time (e.g., tracked via a timer) that is triggered by one or more events/happenings in the traffic expected in DL during which the WTRU (e.g., anchor WTRU) may use a secondary configuration for PDCCH monitoring occasions until the expiry of the time (e.g., via the timer) and the WTRU (e.g., anchor WTRU) reverts to using the primary (e.g., default configuration). The events/happenings in the traffic expected in DL may include, for example, a change in size of PDUs and/or a change in the PDB.

After receiving the configuration information, the WTRU (e.g., anchor WTRU) and/or set of WTRUs in the collaborative group may transmit (e.g., in UL) and receive the first set of DL PDUs in one or more data flows (e.g., after successful decoding of the transmitted PDCCH employing the default PDCCH monitoring occasions). The WTRU (e.g. anchor WTRU) may use information (e.g., spatial information, pose information, temporal information) acquired from the first set of UL and/or DL PDUs in one or more flows and the information regarding the association and/or dependency of the flows, for example, to determine and/or predict changes in aspects (e.g., size of PDU, PDB, and/or joint PDB) of the subsequent set of PDUs the WTRU expects to receive in one or more flows.

The WTRU (e.g., anchor WTRU) may determine the configuration set to use for PDCCH monitoring occasions (e.g., monitoring periodicity, offset, duration) during the time (e.g., DRX ON/active time), for example, based on the received configuration information and the predicted change in aspects of the PDUs expected to be received in one or more flows. The WTRU (e.g., anchor WTRU) may maintain the default configuration for PDCCH monitoring occasions, for example, if the predicted change in aspects of the expected PDUs fall below the configured threshold. Otherwise (e.g., if, on the other hand, the change in one or more aspects of the PDUs expected to be received by the WTRU is above the configured threshold), the WTRU (e.g., anchor WTRU) may send an indication to the network indicating and/or requesting to switch the WTRU's PDCCH monitoring occasions to the secondary configuration, for example, which may include parameters to increase or decrease PDCCH monitoring periodicity and/or increase or decrease PDCCH monitoring duration for the WTRU (e.g., anchor WTRU) and/or other WTRUs in a collaborative WTRU group in preference over the default PDCCH monitoring configuration. The network may respond to the WTRU (e.g., anchor WTRU) and/or other WTRUs in the collaborative WTRU group, for example, by acknowledging and/or granting the change the secondary configuration set for PDCCH monitoring occasions.

A collaborative WTRU may use timing information, for example, to switch between different power saving schemes.

In examples, a collaborative WTRU may use timing information (e.g., track a time via a timer) to switch from a default power saving scheme to a second power saving scheme. The collaborative WTRU may use the second power saving scheme, for example, until it receives an indication from an anchor WTRU to switch back to the default power saving scheme. The collaborative WTRU may track a time (e.g., trigger a timer) based on (e.g., after) reception of the last PDCCH or the last PDSCH to determine the instance for switching to a second power saving scheme (e.g., sparse SSS) from a default power saving scheme (e.g., denser SSS). While the collaborative WTRU is using the second power saving scheme (e.g., sparse SSS), an anchor WTRU may receive DL data after which the anchor WTRU may determine that DL data may (e.g., also) arrive to the collaborative WTRU and may send an indication to the collaborative WTRU (e.g., via SL) for switching back to default power saving scheme (e.g., denser SSS).

An anchor WTRU may assist the network, for example, to align UL transmission instances with CDRX active time.

In example, the WTRU (e.g., anchor WTRU) in a collaborative group may assist the network to adjust the start offset of the CDRX active time (e.g., so that the active time for reception of DL data may align with the UL transmission instance of the WTRU). The WTRU may receive configuration information from the network including one or more of the following: a default and a secondary configuration related to the CDRX active time and start offset value; a threshold value associated with the start of UL transmission time relative to the start offset value of the CDRX active time; etc.

The WTRU (e.g., anchor WTRU) may receive the first set of PDUs in DL using the default set of parameters related to CDRX configuration. In examples, the WTRU (e.g., anchor WTRU) may use the association between UL/DL PDUs and/or between the traffics across WTRUs in the collaborative group to determine the start of UL transmission for a subset of WTRUs or for all WTRUs in the group.

If the start of UL transmission time relative to the start offset value of the CDRX active time is above the threshold value for any of the UEs in the collaborative group, for example, the WTRU (e.g., anchor WTRU) may send an indication to network requesting to use the CDRX active time and start offset value from the second configuration for part of the WTRUs or all the WTRUs in the collaborative group.

If the start of UL transmission time relative to the start offset value of the CDRX active time is above the threshold value for any of the UEs in the collaborative group, for example, the WTRU (e.g., anchor WTRU) may receive an indication from the network instructing it and/or a subset of WTRUs or all WTRUs in the collaborative group to switch to the second CDRX configuration.

An anchor WTRU may assist member WTRUs in a collaborative group in selecting the number of transmit/receive antennas or antenna elements/panels to activate/deactivate for UL/DL transmission.

In examples, a WTRU (e.g., anchor WTRU) in a collaborative group may receive configuration information from the network to send an indication to a WTRU or set of WTRUs in a group of collaborative WTRUs to switch between one or more (e.g., different) antenna configurations (e.g., activate/deactivate a set of antennas or antenna elements/panels) for transmitter diversity and/or maximum beam gain when transmitting in UL and/or during UL beam management. The WTRU (e.g., anchor WTRU) can achieve power saving for itself and for member WTRUs in a collaborative group, for example, by dynamically changing the number active antennas or antenna elements/panels and using only subset of the antenna elements/panel (e.g., subarray size, etc.) whenever possible during UL transmission and/or during PDCCH monitoring.

The WTRU (e.g., anchor WTRU) may use acquired information regarding the link/channel, the member WTRUs in the collaborative group and/or the UL traffic, for example, to select from a set of possible number of antennas or antenna elements/panel (e.g., subarray size) to activate and/or deactivate when performing UL transmission. The information the WTRU (e.g., anchor WTRU) may receive (e.g., need to have available) may include one or more of the following: information regarding the quality of the link or knowledge regarding the UL propagation channel acquired based on past and current measurement (e.g., RSRP, SNR, etc.); information regarding attributes of the UL traffics expected to be transmitted by one or more WTRUs in the collaborative group (e.g., PDU sizes, PDB, etc.); information regarding available antenna configurations for one or more WTRUs in the collaboration group (e.g., set of possible number of antenna elements/panels, subarray size, etc.) that can be used for UL transmission; etc.

The WTRU (e.g., anchor WTRU and/or collaborative WTRU) may receive configuration information from the network (e.g., base station), for example, which may include one or more of the following: threshold values related to the measured channel quality and/or received signal strength; threshold values related to the traffic attributes; threshold values related to a relative distance between anchor WTRUs and member WTRUs; threshold values related to timing information (e.g., time tracked by an active timer); etc.

The WTRU (e.g., anchor WTRU and/or collaborative WTRU) may receive configuration information from the network (e.g., base station) that may include threshold values related to the measured channel quality and/or received signal strength. For example, the WTRU (e.g., anchor WTRU) may receive a set of threshold values (e.g., threshold 1 and threshold 2) related to the channel quality (e.g., CQI) of its Uu link and/or received signal strength in UL (e.g., RSRP, SNR, etc. . . . ). Such threshold may be different (e.g., greater than) from the channel/link quality threshold value used to determine link/beam failure.

The WTRU (e.g., anchor WTRU and/or collaborative WTRU) may receive configuration information from the network (e.g., base station) that may include threshold values related to the traffic attributes. For example, the WTRU (e.g., anchor WTRU) may receive threshold values associated with the PDB and/or joint PDB related to one or more WTRUs in the collaborative group of WTRUs. The WTRU (e.g., anchor WTRU) may receive threshold value associated with the PDU size.

The WTRU (e.g., anchor WTRU and/or collaborative WTRU) may receive configuration information from the network (e.g., base station) that may include threshold values related to a relative distance between an anchor WTRU and one or more member WTRUs. For example, the WTRU (e.g., anchor WTRU and/or collaborative WTRU) may receive threshold values associated with the relative distance between WTRUs in the collaborative group above which link/channel quality measurement may not be assumed to be identical and/or correlated.

The WTRU (e.g., anchor WTRU and/or collaborative WTRU) may receive configuration information from the network (e.g., base station) that may include threshold values related to an active timer. The active timer may assist in determining an amount of time (e.g., a duration of time) that may elapse where the WTRU may be active. For example, the WTRU (e.g., anchor WTRU and/or collaborative WTRU) may receive threshold values associated with timing information (e.g., one or set of timers, one or more durations of time, one or more amounts of time, and/or the like) used to determine when switching between a set of possible antenna configurations may be appropriate.

The WTRU (e.g., anchor WTRU and/or collaborative WTRU) may receive the configuration information and/or other information, for example, via SL (e.g., from collaborative WTRUs), AS layer signaling (e.g., RRC signaling/messages, MAC CE or DCI), or Non-AS (NAS) layer signaling (e.g., PDU session related messages), for example.

WTRUs in the collaborative group (e.g., after receiving the configuration information) may start transmitting PDUs to a receiving entity (e.g., base station), for example, via their corresponding Uu link using a default antenna configuration (e.g., using a default subarray size) during its active period. The WTRUs in the group may (e.g., also) perform measurements in the channel (e.g., RSRP, RSRQ, RSSI measurements) to determine the link quality and for determination of UL transmit beam, for example. The WTRUs may perform the measurements periodically (e.g., SRS) or may be triggered to do measurements (e.g., based on receiving commands from the network or anchor WTRU).

In examples, the WTRU (e.g., anchor WTRU) may receive the link/channel quality measurements (e.g., RSRP, RSRQ, RSSI . . . etc.) reported by one or more WTRU in the collaborative group as well as UL receiving entity (e.g., base station). The WTRU (e.g., anchor WTRU) may obtain information regarding the designed antenna capabilities (e.g., total number antenna elements/panels, etc.) of member WTRUs in the collaborating group. The WTRU (e.g., anchor WTRU) may determine and/or predict the expected quality of a UL link/channel corresponding to one or more WTRUs in the collaborative group for an extended duration of time, for example, based on the received link/channel quality measurements reported by member WTRUs and/or the UL receiving entity (e.g., base station).

In examples, a WTRU (e.g., anchor WTRU) may use a threshold value related to its distance relative to the WTRUs in a collaborative group to gather and/or identify a subset of WTRUs for which UL link/channel quality and/or conditions are (e.g., almost) identical. The WTRU (e.g., anchor WTRU) may determine and/or predict the expected UL link/channel quality corresponding to one or more WTRUs in the subset of WTRUs within the collaborative group based on current and past measurements on the DL channels and/or measurement reports received from UL receiving entity (e.g., base station) regarding the quality of UL channel. The WTRU (e.g., anchor WTRU) may indicate to the corresponding WTRU or subset of WTRUs to activate higher number antenna elements (e.g., when transmitting in UL for improved transmit diversity and/or beamforming gain), for example, if the WTRU (e.g., anchor WTRU) determines and/or predicts the expected UL channel quality to fall below the threshold values (e.g., low RSRP, SINR).

In examples, the WTRU (e.g., anchor WTRU) and/or set of WTRUs in collaborative group may transmit in UL using a default antenna configurations (e.g., default number antennas or antenna elements/panels) corresponding to a configured (e.g., maximum) number of layers. The WTRU (e.g., anchor WTRU) and/or set of WTRUs in collaborative group may receive the first set of DL PDUs based on which the WTRU (e.g. anchor WTRU) may use the information (e.g., spatial information, pose information, temporal information), acquired from the set of UL and/or DL PDUs across the group of collaborative WTRUs, and the information regarding the association and/or dependency of the traffics, for example, to determine and/or predict changes in aspects (e.g., size of PDU, PDB and/or joint PDB) of the subsequent set of PDUs the WTRU (e.g., anchor WTRU) to send in UL. The WTRU (e.g., anchor WTRU) may also use the information to determine and/or predict changes in aspects (e.g., size of PDU) of the subsequent set of PDUs the set of WTRUs in the collaborative group may be expected to send in UL.

In an example, the WTRU (e.g., anchor WTRU) may use the set of threshold values related to PDU sizes to dynamically select the maximum number of layers a WTRU or set of WTRUs in the collaborative group may be configured with and may use a higher or smaller number of antennas or antenna elements/panels according to the selected maximum number of layers. If the sizes of the PDUs to be sent in UL are expected to be large and/or above a threshold value, then the maximum number of layers may be large and may use of a higher number of antennas.

If the sizes of the PDUs to be sent in UL are expected to be smaller, then the maximum number of layers may be be smaller and a small number of antennas may be active. The WTRU (e.g., anchor WTRU) may send an indication to network (e.g., base station) regarding the selected maximum number of layers it (anchor WTRU) and/or the set of WTRUs in the collaborative group may be configured with and the WTRU may receive acknowledgement. The WTRU (e.g., anchor WTRU) may also send (via SL) indication to the corresponding WTRU s in the collaborative group regarding the selected maximum number of layers and activate/deactivate the number of antennas or antenna elements/panels needed accordingly.

An anchor WTRU may assist WTRUs in a collaborative group to switch between a default and a second antenna configurations (e.g., activate a smaller or higher number of receiver antennas or antenna elements/panels), for example, if (e.g., when) monitoring a PDCCH and receiving DL data. The WTRU (e.g., anchor WTRU) and member WTRUs in the collaborative group may use a (e.g., default) number of antennas (e.g., activate smaller number of receive antennas or antenna elements/panels), for example, if (e.g., when) monitoring a PDCCH and receive the first PDCCH transmission. The WTRU (e.g., anchor WTRU) may switch to using the second antenna configuration (e.g., activate all available receive antennas or antenna elements/panels), for example, based on (e.g., after) receiving the first PDCCH transmission when performing a denser PDCCH monitoring and receiving DL data. The WTRU (e.g., anchor WTRU) may (e.g., also) determine that one or a set of WTRUs in the collaborative group (e.g., which may still be monitoring for PDCCH transmissions using their default antenna configuration) may (e.g., soon) start receiving PDCCH transmission(s) based on the association of the traffic across the collaborative WTRU group, for example, after receiving the first PDCCH and switching to the second antenna configuration. The WTRU (e.g., anchor WTRU) may send an indication (e.g., via SL) to member WTRUs to start using denser PDCCH monitoring instances and switch to using their second antenna configuration (e.g., activate all available receive antennas or antenna elements/panels). Member WTRUs may track corresponding times (e.g., also start their corresponding timers) to measure the duration of instance the WTRUs (e.g., need to) wait for the start of the arrival of DL data before falling back to using sparser PDCCH monitoring instances and switching to their default antenna configuration, for example, after receiving the indication from an anchor WTRU and switching to their second antenna configuration when monitoring PDCCH.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. An anchor wireless transmit/receive unit (WTRU) comprising:
- a processor configured to:
  - receive, from a base station, configuration information associated with a first member WTRU, wherein the configuration information associated with the first member WTRU comprises a first parameter set, a second parameter set, and a first threshold;
  - determine a first duration associated with the first parameter set and an expected UL traffic associated with the first member WTRU;
  - determine that the first duration is greater than the first threshold; and
  - send a first indication to the base station based on the determination that the first duration is greater than the first threshold, wherein the first indication indicates the second parameter set for the first member WTRU.

2. The anchor WTRU of claim 1, wherein the first indication further indicates that the second parameter set is preferred for the first member WTRU.

3. The anchor WTRU of claim 1, wherein the first parameter set comprises a first parameter associated with connected mode discontinuous reception and the second parameter set comprises a second power saving parameter associated with connected mode discontinuous reception.

4. The anchor WTRU of claim 1, wherein the processor is further configured to:
- receive configuration information associated with a second member WTRU, wherein the configuration information associated with the second member WTRU comprises a third parameter set, a fourth parameter set, and a second threshold, wherein the third parameter set is different from the first parameter set, wherein the fourth parameter set is different from the second parameter set, and wherein the second threshold is different from the first threshold.

5. The anchor WTRU of claim 4, wherein the processor is further configured to:
- determine a second duration associated with the third parameter set and an expected UL traffic associated with the second member WTRU;
- determine that the second duration is greater than the second threshold; and
- determine to send a second indication to the base station based on the second duration, wherein the second indication indicates that the fourth parameter set is preferred for the second member WTRU.

6. The anchor WTRU of claim 1, wherein the first parameter set indicates a first start time associated with a connected mode discontinuous reception on (CDRX ON) duration, and wherein the first duration is a difference between a time associated with the expected UL traffic associated with the first member WTRU and the first start time associated with the CDRX ON duration.

7. The anchor WTRU of claim 6, wherein the second parameter set indicates a second start time associated with the CDRX ON duration.

8. The anchor WTRU of claim 1, wherein the anchor WTRU, the first member WTRU and a second member WTRU are in a collaborative group.

9. A method comprising:
- receiving, from a base station, configuration information associated with a first member WTRU, wherein the configuration information associated with the first member WTRU comprises a first parameter set, a second parameter set, and a first threshold;
- determining a first duration associated with the first parameter set and an expected UL traffic associated with the first member WTRU;
- determining that the first duration is greater than the first threshold; and
- sending a first indication to the base station based on the determination that the first duration is greater than the first threshold, wherein the first indication indicates the second parameter set for the first member WTRU.

10. The method of claim 9, wherein the first indication further indicates that the second parameter set is preferred for the first member WTRU.

11. The method of claim 9, wherein the first parameter set comprises a first parameter associated with connected mode discontinuous reception and the second parameter set comprises a second power saving parameter associated with connected mode discontinuous reception.

12. The method of claim 9, wherein the method further comprises:

receiving configuration information associated with a second member WTRU, wherein the configuration information associated with the second member WTRU comprises a third parameter set, a fourth parameter set, and a second threshold, wherein the third parameter set is different from the first parameter set, wherein the fourth parameter set is different from the second parameter set, and wherein the second threshold is different from the first threshold.

13. The method of claim 12, wherein method further comprises:

determining a second duration associated with the third parameter set and an expected UL traffic associated with the second member WTRU;

determining that the second duration is greater than the second threshold; and determining to send a second indication to the base station based on the second duration, wherein the second indication indicates that the fourth parameter set is preferred for the second member WTRU.

14. The method of claim 9, wherein the first parameter set indicates a first start time associated with a connected mode discontinuous reception on (CDRX ON) duration, and wherein the first duration is a difference between a time associated with the expected UL traffic associated with the first member WTRU and the first start time associated with the CDRX ON duration.

15. The method of claim 14, wherein the second parameter set indicates a second start time associated with the CDRX ON duration.

16. The method of claim 9, wherein an anchor WTRU, the first member WTRU and a second member WTRU are in a collaborative group.

* * * * *